US012806095B2

(12) United States Patent
Moenter et al.

(10) Patent No.: US 12,806,095 B2
(45) Date of Patent: Nov. 24, 2026

(54) ARTICULATION MECHANISMS FOR A PATIENT SUPPORT APPARATUS

(71) Applicant: Hill-Rom Services, Inc., Batesville, IN (US)

(72) Inventors: Jonathan K. Moenter, Batesville, IN (US); Jonathan D. Turner, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 144 days.

(21) Appl. No.: 18/680,889

(22) Filed: May 31, 2024

(65) Prior Publication Data

US 2024/0398641 A1 Dec. 5, 2024

Related U.S. Application Data

(60) Provisional application No. 63/643,397, filed on May 6, 2024, provisional application No. 63/505,196, filed on May 31, 2023.

(51) Int. Cl.

| | |
|---|---|
| ***A61G 7/015*** | (2006.01) |
| ***A61G 7/018*** | (2006.01) |
| ***A61G 7/075*** | (2006.01) |

(52) U.S. Cl.

CPC ............. *A61G 7/015* (2013.01); *A61G 7/018* (2013.01); *A61G 7/0755* (2013.01)

(58) Field of Classification Search

CPC ....... A61G 7/015; A61G 7/018; A61G 7/0755
See application file for complete search history.

(56) References Cited

U.S. PATENT DOCUMENTS

| | | | | |
|---|---|---|---|---|
| 4,078,269 A | | 3/1978 | Weipert | |
| 4,307,874 A | * | 12/1981 | Reuschenbach | F16F 9/49 188/300 |
| 4,461,320 A | | 7/1984 | Barbagli | |

(Continued)

FOREIGN PATENT DOCUMENTS

| | | | | |
|---|---|---|---|---|
| CN | 111012098 A | * | 4/2020 | A47C 17/162 |
| CN | 112618192 A | * | 4/2021 | A61G 7/00 |

(Continued)

OTHER PUBLICATIONS

PCT Search Report and Written Opinion in the related application PCT/US2024/032071, Nov. 26, 2024, 14 pages.
Hill-Rom GPS Service Manual, 1994, 101 pages.

*Primary Examiner* — Eric J Kurilla
(74) *Attorney, Agent, or Firm* — Barnes & Thornburg LLP

(57) ABSTRACT

A modular patient support apparatus includes mechanisms, which provide advanced kinematics for moving portions of the patient support apparatus. The patient support apparatus includes a releasing assembly connected to the head deck section that assists in the raising and lowering of the head deck section by unlocking an adjustable-length strut. The patient support apparatus includes an over-center calf deck section mechanism that assists the user in pulling or holding calf deck section up when at or near a flat position, reducing the amount of input force needed to articulate the calf deck section, and self-retracting the calf deck section down when the calf deck section is at or near the fully articulated position.

20 Claims, 23 Drawing Sheets

(56) References Cited

U.S. PATENT DOCUMENTS

| | | | | | |
|---|---|---|---|---|---|
| 4,709,790 | A | * | 12/1987 | Freitag | F16F 9/0272 188/300 |
| 4,751,754 | A | | 6/1988 | Bailey et al. | |
| 4,862,529 | A | | 9/1989 | Peck | |
| 4,912,787 | A | | 4/1990 | Bradcovich | |
| 5,063,624 | A | | 11/1991 | Smith et al. | |
| 5,074,000 | A | | 12/1991 | Soltani et al. | |
| 5,444,880 | A | | 8/1995 | Weismiller et al. | |
| 5,715,548 | A | | 2/1998 | Ulrich et al. | |
| 5,802,638 | A | * | 9/1998 | Parker | F16F 9/44 60/477 |
| 5,996,151 | A | | 12/1999 | Bartow et al. | |
| 6,163,903 | A | * | 12/2000 | Weismiller | A61G 7/0507 5/610 |
| 6,230,343 | B1 | | 5/2001 | Buiskool et al. | |
| 6,315,319 | B1 | | 11/2001 | Blyshak et al. | |
| 6,352,240 | B1 | | 3/2002 | Eckstein et al. | |
| 6,772,850 | B1 | | 8/2004 | Waters et al. | |
| 6,820,294 | B2 | | 11/2004 | Shiery et al. | |
| 7,017,208 | B2 | | 3/2006 | Weismiller et al. | |
| 7,124,456 | B2 | | 10/2006 | Palmatier et al. | |
| 7,150,056 | B2 | | 12/2006 | Lemire | |
| 7,805,784 | B2 | | 10/2010 | Lemire et al. | |
| 8,104,122 | B2 | | 1/2012 | Richards et al. | |
| 8,151,387 | B2 | | 4/2012 | Kinker, Jr. et al. | |
| 8,893,747 | B2 | | 11/2014 | Wei | |
| 8,910,329 | B2 | | 12/2014 | Turner et al. | |
| 9,009,893 | B2 | | 4/2015 | Riggs et al. | |
| 9,027,183 | B2 | | 5/2015 | Childs et al. | |
| 9,107,783 | B2 | | 8/2015 | Childs et al. | |
| 10,240,684 | B2 | | 3/2019 | John et al. | |
| 10,251,797 | B2 | | 4/2019 | Riggs et al. | |
| 10,555,850 | B2 | | 2/2020 | Meyer et al. | |
| 10,987,260 | B2 | | 4/2021 | Souke et al. | |
| 11,441,693 | B2 | | 9/2022 | Huynh | |
| 11,583,455 | B2 | | 2/2023 | Souke et al. | |
| 11,666,494 | B2 | | 6/2023 | Souke et al. | |
| 11,730,650 | B2 | | 8/2023 | Mansfield et al. | |
| 11,865,051 | B2 | | 1/2024 | Souke et al. | |
| 11,896,531 | B2 | | 2/2024 | Lucas et al. | |
| 2005/0115303 | A1 | | 6/2005 | Marx | |
| 2006/0096029 | A1 | | 5/2006 | Kinker et al. | |
| 2007/0136949 | A1 | | 6/2007 | Richards et al. | |
| 2008/0295248 | A1 | | 12/2008 | Hayes et al. | |
| 2009/0313758 | A1 | | 12/2009 | Vanderpohl, III et al. | |
| 2011/0162145 | A1 | | 7/2011 | Kinker, Jr. et al. | |
| 2012/0073052 | A1 | * | 3/2012 | Meyer | A61G 7/018 5/615 |
| 2012/0151678 | A1 | * | 6/2012 | Richards | A61G 7/002 5/613 |
| 2012/0174316 | A1 | | 7/2012 | Shih | |
| 2014/0013512 | A1 | | 1/2014 | Turner et al. | |
| 2014/0115785 | A1 | * | 5/2014 | Turner | A61G 7/0509 5/617 |
| 2017/0051841 | A1 | | 2/2017 | Huynh | |
| 2017/0281438 | A1 | * | 10/2017 | Elku | A61G 7/015 |
| 2017/0370497 | A1 | | 12/2017 | John et al. | |
| 2018/0055234 | A1 | | 3/2018 | Strater | |
| 2023/0107717 | A1 | * | 4/2023 | Newkirk | A61G 7/015 5/614 |

FOREIGN PATENT DOCUMENTS

| | | | |
|---|---|---|---|
| EP | 1621171 | A1 | 2/2006 |
| WO | 2007075701 | A2 | 7/2007 |
| WO | 2011046926 | A2 | 4/2011 |
| WO | 2013158580 | A2 | 10/2013 |

* cited by examiner

ARTICULATION MECHANISMS FOR A PATIENT SUPPORT APPARATUS

PRIORITY CLAIM

This application claims priority under 35 U.S.C. § 119(e) to U.S. Provisional Application Nos. 63/505,196, filed May 31, 2023, and 63/643,397, filed May 6, 2024, which are each expressly incorporated by reference herein in their entirety.

BACKGROUND

The present disclosure is related to a modular patient support apparatus that is adaptable to various levels of acuity to provide support to a patient with minimal caregiver help. More specifically, the present disclosure is related to a patient support apparatus that has an articulation mechanism that is adaptable to articulate different components of the patient support apparatus.

In the modern healthcare facility, patients are often kept for extended periods in the emergency unit or an observation ward on patient support apparatus while tests are run and the patient is under observation. Patient support apparatus (i.e., beds and stretchers) typically have manual articulation controls that require pulling one of two or more handles to release a locked component so that a portion of the patient support apparatus's frame can be articulated. For example, pulling a handle on the top corner of the stretcher's head section may release the head section's locking gas spring so that the head section could be raised or lowered. The challenge with these articulation control systems is designing them so that the patient support apparatus can be articulated by using either one handle at a time or both handles at the same time. The control systems get complex, are costly, and have multiple adjustment points for tuning the actuation stroke of the total system.

In some instances, the patient may be in significant discomfort, lack mobility, or be otherwise incapacitated. As such, there may be a need to articulate the patient support apparatus based on the patient's acuity level. Thus, there is a need for a patient support apparatus structure that has common elements for basic operation, but that can be articulated easily. The disclosure is directed to systems and methods to transfer a pull motion from one handle while maintaining constant tension in both handles, resulting in an improved perception and feeling of quality.

SUMMARY

An apparatus, system, or method may comprise one or more of the features recited in the appended claims and/or the following features which, alone or in any combination, may comprise patentable subject matter:

According to the present disclosure, a patient support apparatus is provided. The patient support apparatus may comprise a lower frame, an upper frame, and a support deck. The upper frame may be movable vertically relative to the lower frame. The upper frame may include at least one sleeve. The support deck may be movable relative to the upper frame. The support deck may include a pivot yoke and a rod coupled to the pivot yoke. The rod may be supported in the at least one sleeve such that the at least one sleeve restricts the rod to move along an axis so as to control movement of the pivot yoke to move linearly along a path that is parallel to the axis.

Optionally, the patient support apparatus may further comprise a variable length strut positioned between the upper frame and the support deck. The variable length strut may change length as the rod moves in the at least one sleeve. The variable length strut may include a lock to lock the variable length strut in at a particular length. The patient support apparatus may further comprise a control link pivotably coupled to the upper frame and pivotably coupled to the support deck. The control link may cooperate with the rod, the pivot yoke, and the variable length strut to define the motion of the support deck relative to the upper frame.

Further optionally, the variable length strut may be manually adjustable between a locked state and an unlocked state. In the unlocked state a length of the variable length strut may be varied to change a position of the support deck relative to the upper frame. The variable length strut may be manually adjustable between a locked state and an unlocked state. In the unlocked state a length of the variable length strut may be varied to change a position of the support deck relative to the upper frame. The variable length strut may be an electric actuator.

If desired, the upper frame may further comprise a low friction bearing positioned within the at least one sleeve. The low friction bearing may support the rod. The low friction bearing may be a multi-piece bearing. The patient support apparatus may further comprise a lockable variable length strut positioned between the upper frame and the support deck. The lockable variable length strut may change length as the rod moves in the at least one sleeve. The lockable variable length strut may be biased to extend to provide assistance in moving the support deck from a lowered positon to a raised position. The patient support apparatus may further comprise a control link pivotably coupled to the upper frame and pivotably coupled to the support deck. The control link may cooperate with the upper frame, the support deck, and the lockable variable length strut to form a four-bar linkage that defines the motion of the support deck relative to the pivot yoke.

Further according to the present disclosure, a patient support apparatus may be provided. The patient support apparatus may comprise a lower frame, an upper frame, and a support deck. The upper frame may be movable vertically relative to the lower frame. The upper frame may include a first sleeve and a second sleeve positioned on opposing lateral sides of the upper frame. The support deck may be movable relative to the upper frame. The support deck may include a first pivot yoke having a first rod coupled to the first pivot yoke and a second pivot yoke having a second rod coupled to the second pivot yoke. The first and second rods may be supported in the first and second sleeves such that one of the first and second sleeves restricts the respective first and second rods to move along a respective first and second axis so as to control movement of the respective first and second pivot yokes to move linearly along a respective path that is parallel to the respective first and second axis.

If desired, the patient support apparatus may further comprise a variable length strut positioned between the upper frame and the support deck. The variable length strut may change length as the first rod moves in the first sleeve. The variable length strut may include a lock to lock the variable length strut in at a particular length. The patient support apparatus may further comprise first and second control links pivotably coupled to the upper frame on the opposing lateral sides of the upper frame and pivotably coupled to the support deck at opposing lateral sides of the support deck. The first and second control links may cooperate with the first and second rods, the first and second pivot yokes, and the variable length strut to define the motion of the support deck relative to the upper frame.

Alternatively, the variable length strut may be manually adjustable between a locked state and an unlocked state. In the unlocked state a length of the variable length strut may be varied to change a position of the support deck relative to the upper frame. The variable length strut may be manually adjustable between a locked state and an unlocked state. In the unlocked state a length of the variable length strut may be varied to change a position of the support deck relative to the upper frame. The variable length strut may be an electric actuator.

Additionally, the upper frame may further comprise a respective low friction bearing positioned within each of the first and second sleeves. The respective low friction bearings may support the respective first and second rods. Each of the low friction bearings may be a multi-piece bearing. The patient support apparatus may further comprise a lockable variable length strut positioned between the upper frame and support deck. The lockable variable length strut may change length as the first rod moves in the first sleeve. The lockable variable length strut may be biased to extend to provide assistance in moving the support deck from a lowered positon to a raised position.

Optionally, the patient support apparatus may further comprise first and second control links pivotably coupled to the upper frame on the opposing lateral sides of the upper frame and pivotably coupled to the support deck at opposing lateral sides of the support deck. The first and second control links may cooperate with the first and second rods, the first and second pivot yokes, and the lockable variable length strut to define the motion of the support deck relative to the upper frame. The lockable variable length strut may move between a fully retracted position when the upper frame is in a lowered position and a fully extended position when the upper frame is in a fully raised position. The lockable variable length strut may include a first bias rate at the fully retracted position. A bias rate may decrease from the first bias rate as the lockable variable length strut is extended. The lockable variable length strut may move between a fully retracted position when the upper frame is in a lowered position and a fully extended position when the upper frame is in a fully raised position. The lockable variable length strut may include a first bias rate at the fully retracted position. A bias rate may decrease from the first bias rate as the lockable variable length strut is extended.

Further optionally, the patient support apparatus may further comprise first and second control links pivotably coupled to the upper frame on the opposing lateral sides of the upper frame and pivotably coupled to the support deck at opposing lateral sides of the support deck. The first and second control links may cooperate with the first and second rods, the first and second pivot yokes, and a variable length strut to define the motion of the support deck relative to the upper frame. The variable length strut may be manually adjustable between a locked state and an unlocked state. In the unlocked state a length of the variable length strut may be varied to change a position of the support deck relative to the upper frame. The variable length strut may be an electric actuator. The variable length strut may be positioned between the upper frame and the support deck.

Further according to the present disclosure, a patient support apparatus is provided. The patient support apparatus includes a lower frame, an intermediate frame, an upper frame, a plurality of deck sections, and a lift mechanism. The lower frame may have a first end and a second end. The intermediate frame may have a first end and a second end. The first end and the second end of the intermediate frame may correspond directionally to the first and second ends of the lower frame. The upper frame may be supported on the intermediate frame and may have a first end and a second end. The first end and the second end of the upper frame may correspond directionally to the first and second ends of the lower frame. The plurality of deck sections may be positioned on the upper frame. The lift mechanism may be operable to move the intermediate frame vertically relative to the lower frame and moveable between a fully lowered position and a fully raised position. The lift mechanism may comprise a four bar linkage driven by a single actuator. The four bar linkage may nest within an outer boundary of members of the intermediate frame and the lower frame when the lift mechanism is in the fully lowered position.

Optionally, the intermediate frame may be positioned to be nested within the upper frame. A first end of the four bar linkage may be coupled to the lower frame adjacent the first end of the lower frame. A second end of the four bar linkage may be coupled to the intermediate frame nearer the second end of the intermediate frame than the first end of the intermediate frame such that the first end of the intermediate frame is positioned generally above the first end of the lower frame. The single actuator may be a manually operated hydraulic actuator. The single actuator may include an electrically operated hydraulic pump operable to extend the single actuator. The single actuator may be lowered by a foot pedal. The single actuator may be a single actuating hydraulic cylinder. The patient support apparatus may include a foot pedal that is operable to release the single actuating hydraulic cylinder to cause the lift mechanism to be lowered due to a weight supported by the single actuating hydraulic actuator.

Further optionally, the lift mechanism may comprise a pair of four bar linkages positioned on opposite sides of the single actuator. The lift mechanism may further comprise a pair of gas springs positioned on opposite sides of the single actuator. The gas springs may be operable to act on the four bar linkages in the fully lowered position to provide additional lifting force during a portion of the movement of the lift mechanism between the fully lowered position and the fully raised position. The lift mechanism may comprise a pair of four bar linkages positioned on opposite sides of the single actuator. The lift mechanism may further comprise a pair of gas springs positioned on opposite sides of the single actuator. The gas springs may be operable to act on the four bar linkages in the fully lowered position to provide additional lifting force during a portion of the movement of the lift mechanism between the fully lowered position and the fully raised position.

If desired, an electrical switch may be activated by movement of a foot pedal. Activation of the electrical switch may cause the lift mechanism to be automatically moved between the fully lowered position and the fully raised position. The patient support apparatus may further comprise an indicator operable to indicate that the electrical switch is present on the patient support apparatus. The single actuator may be released by a foot pedal. The single actuator may be a single actuating hydraulic cylinder. The patient support apparatus may include a foot pedal that is operable to release the single actuating hydraulic cylinder to cause the lift mechanism to be lowered due to the weight supported by the single actuator.

Alternatively, the lift mechanism may further include a visual indicator that provides an indication of a height of the upper frame relative to the lower frame. The patient support apparatus may further include a siderail supported on the upper frame. The siderail may include an indicator positioned on the siderail. The indicator may be configured to illuminate in different colors to provide an indication of the status of a component of the patient support apparatus. The patient support apparatus may further comprise a pair of arms positioned adjacent a foot end of the patient support apparatus. The arms may be operable to be used as push handles for the patient support apparatus when the arms are in respective lowered positions, and may be configured to be used as leg supports for a patient supported on the patient support apparatus when the respective arms are in raised positions.

Additionally, the upper frame of the patient support apparatus may be pivotable relative to the lift mechanism to cause the upper frame to move between a level position and a tilt position. The movement of the upper frame relative to the lift mechanism may be accomplished manually. The patient support apparatus may further comprise a tilt mechanism including a plurality of tilt control cylinders that are configured to balance the weight on the patient support apparatus while the upper frame is tilted relative to the lift mechanism. The patient support apparatus may further comprise an indicator system displaying indicators of the status of components of the patient support apparatus on the lower frame of the patient support apparatus.

Optionally, the patient support apparatus may further comprise an indicator system configured to display indicators of the status of components of the patient support apparatus on a floor adjacent the lower frame of the patient support apparatus. The indicators displayed on the floor may be projected from the lower frame. The patient support apparatus may further comprise electrical components in a siderail of the patient support apparatus. The siderail of the patient support apparatus may be collapsible. Electrical signals provided by the patient support apparatus to the electrical components in the siderail may be transmitted through a cable that includes a plurality of coils wrapped around a pivot rod of the siderail of the patient support apparatus.

Further optionally, the plurality of deck sections of the patient support apparatus may include a head deck section that pivots about a pivot point that moves in a linear direction as the head deck section is pivoted between a lowered position and a raised position. A head deck section pivot point may move linearly on a pivot positioned on a linear rod. The linear rod may be supported on a bearing within a sleeve. The bearing and the sleeve may cooperate to control the direction of movement of the pivot.

Further according to the present disclosure, a patient support apparatus is provided. The patient support apparatus may comprise an intermediate frame, an upper frame, a lift mechanism, and a tilt mechanism. The intermediate frame may have a first end and a second end. The upper frame may be supported on the intermediate frame and may have a first end and a second end. The first end and the second end of the upper frame may correspond directionally to the first and second ends of the intermediate frame. The lift mechanism may be operable to move the intermediate frame vertically relative to a floor. The tilt mechanism may comprise a plurality of tilt control cylinders that are configured to balance the weight on the patient support apparatus while the upper frame is tilted relative to the lift mechanism.

Optionally, the intermediate frame may be positioned to be nested within the upper frame. The lift mechanism may include a visual indicator that provides an indication of the height of the upper frame relative to a lower frame included in the patient support apparatus. The patient support apparatus may further comprise a siderail supported on the upper frame. The siderail may include an indicator positioned on the siderail. The indicator may be configured to illuminate in different colors to provide an indication of the status of a component of the patient support apparatus. The patient support apparatus may further comprise a pair of arms positioned adjacent a foot end of the patient support apparatus. The arms may be operable to be used as push handles for the patient support apparatus when the arms are in respective lowered positions, and may be configured to be used as leg supports for a patient supported on the patient support apparatus when the respective arms are in raised positions.

Further optionally, the upper frame of the patient support apparatus may be pivotable relative to the lift mechanism to cause the upper frame to move between a level position and a tilt position. The movement of the upper frame relative to the lift mechanism may be accomplished manually. The patient support apparatus may further comprise an indicator system displaying indicators of the status of components of the patient support apparatus on a lower frame of the patient support apparatus. The patient support apparatus may further comprise an indicator system configured to display indicators of the status of components of the patient support apparatus on a floor adjacent a lower frame of the patient support apparatus. The indicators displayed on the floor may be projected from the lower frame.

If desired, the patient support apparatus may further comprise electrical components in a siderail of the patient support apparatus. The siderail of the patient support apparatus may be collapsible. Electrical signals provided by the patient support apparatus to the electrical components in the siderail may be transmitted through a cable that includes a plurality of coils wrapped around a pivot rod of the siderail of the patient support apparatus. The patient support apparatus may further comprise a head deck section supported on the upper frame. The head deck section may pivot about a pivot point that moves in a linear direction as the head deck section is pivoted between a lowered position and a raised position. The patient support apparatus may further comprise a head deck section supported on the upper frame. A head deck section pivot point may move linearly on a pivot positioned on a linear rod. The linear rod may be supported on a bearing within a sleeve. The bearing and the sleeve may cooperate to control the direction of movement of the head deck section pivot point along an axis.

Further according to the present disclosure, a patient support apparatus is provided. The patient support apparatus may comprise an intermediate frame, an upper frame, a siderail, and a control system. The upper frame may be supported on the intermediate frame. The siderail may be supported on the upper frame. The siderail may comprise a base, a lower arm pivotably coupled to the base, and an upper arm pivotably coupled to the lower arm. The control system may include circuitry for controlling components of the patient support apparatus. The control system may include a user interface supported on the upper arm of the siderail, a controller, and a cable connecting the user interface to the controller. The cable may comprise a plurality of coils wrapped around a pivot rod of the siderail of the patient support apparatus. The plurality of coils may be arranged to expand and contract as the siderail is moved between a raised position and a lowered position causing pivoting of the upper arm relative to the lower arm.

Optionally, the intermediate frame may be positioned to be nested within the upper frame. The siderail may include an indicator positioned on the siderail. The indicator may be configured to illuminate in different colors to provide an indication of the status of a component of the patient support apparatus. The patient support apparatus may further comprise a pair of arms positioned adjacent a foot end of the patient support apparatus. The arms may be operable to be used as push handles for the patient support apparatus when the arms are in respective lowered positions, and may be configured to be used as leg supports for a patient supported on the patient support apparatus when the respective arms are in raised positions. The upper frame of the patient support apparatus may be pivotable relative to a lift mechanism to cause the upper frame to move between a level position and a tilt position. The movement of the upper frame relative to the lift mechanism may be accomplished manually.

Further optionally, the patient support apparatus may further comprise an indicator system displaying indicators of the status of components of the patient support apparatus on a lower frame of the patient support apparatus. The patient support apparatus may further comprise a lower frame, a lift mechanism, and an indicator system. The lower frame may support the lift mechanism. The indicator system may be configured to display indicators of the status of components of the patient support apparatus on a floor adjacent the lower frame of the patient support apparatus. The indicators displayed on the floor may be projected from the lower frame. The patient support apparatus may further comprise a head deck section supported on the upper frame. The head deck section may pivot about a pivot point that moves in a linear direction as the head deck section is pivoted between a lowered position and a raised position. The patient support apparatus may further comprise a head deck section supported on the upper frame. A head deck section pivot point may move linearly on a pivot positioned on a linear rod. The linear rod may be supported on a bearing within a sleeve. The bearing and the sleeve may cooperate to control the direction of movement of the head deck section pivot point along an axis.

If desired, the patient support apparatus may further comprise a lower frame and a lift mechanism. The lift mechanism may be operable to move the intermediate frame vertically relative to the lower frame. The lift mechanism may be moveable between a fully lowered position and a fully raised position. The lift mechanism may comprise a four bar linkage driven by a single electrically powered actuator. The controller of the control system may be operable to receive a signal from a user input associated with the operation of the single electrically powered actuator and to cause the lift mechanism to operate.

Alternatively, an electrical switch may be activated by movement of a foot pedal. Activation of the electrical switch may cause the lift mechanism to be automatically moved between the fully lowered position and the fully raised position. The patient support apparatus may further comprise an indicator operable, under the control of the controller, to indicate that the electrical switch is present on the patient support apparatus. The foot pedal may be operable to manually drive the single electrically powered actuator during a portion of the stroke of the foot pedal. The electrical switch may be activated after the foot pedal is fully actuated. The control system may include a battery. The controller may include a microprocessor based system on a module (SOM) that places one or more functions in low power mode when not in use. The SOM may be operable to write the state of the execution file to flash memory and stop the operation of the microprocessor when the SOM enters a low power mode. The execution file may be reloaded to a microprocessor random access memory when the SOM exits the low power mode. The SOM may further comprise a radio. Portions of the radio may be stopped under certain conditions. The radio may be operable to monitor for a particular message directed to the radio of the SOM. The radio may be restarted when the particular message is received.

Further according to the present disclosure, a medical device is provided. The medical device may comprise a control system including circuitry for controlling components of a patient support apparatus. The control system may include a user interface, a battery, and a controller. The controller may comprise a microprocessor based system on a module (SOM). The SOM may be operable to transition into a low power mode wherein the microprocessor stops operation and to return from the low power mode by operating an executable file that was being processed by the microprocessor beginning at the same instructions being executed at the time the SOM transitioned to the low power mode.

Additionally, the SOM may be operable to write the state of the execution file to flash memory and stop the operation of the microprocessor when the SOM enters the low power mode. The execution file may be reloaded to a microprocessor random access memory when the SOM exits the low power mode. The SOM may further comprise a radio. Portions of the radio may be stopped under certain conditions. The radio may be operable to monitor for a particular message directed to the radio of the SOM and the radio may be restarted when the particular message is received. The medical device may be operable to receive a signal from a user input associated with the operation of an optional feature of the medical device. The medical device may further comprise an indicator operable, under the control of the controller, to indicate that the optional feature is present on the medical device.

Further according to the present disclosure, a patient support apparatus is provided. The patient support apparatus may comprise a support frame, a patient deck section, an adjustable-length strut, and a release assembly. The patient deck section may be movably coupled to the support frame for movement relative to the support frame. The adjustable-length strut may be positioned between the support frame and the patient deck section. The adjustable-length strut may be movable between a first position and a second position. The adjustable-length strut may be lockable at a plurality of positions therebetween the first position and the second position. The release assembly may be for transferring an activation force by a user to change the adjustable-length strut from being in a locked position to being in an unlocked position. The release assembly may include a shuttle assembly configured to reduce the activation force required to unlock the adjustable-length strut.

Optionally, a first end of a Bowden cable may be fastened to the shuttle assembly and a second end of the Bowden cable may be attached to a locking mechanism of the adjustable-length strut. The activation force from a first handle or from a second handle may be translated through a cable to the shuttle assembly situated on a track. The shuttle assembly may be configured to move linearly on the track in response to the activation force applied to the first handle or to the second handle. The shuttle assembly may comprise a bottom half, a top half covering the bottom half, and a rotating element located on a pivot pin extending from the bottom half towards the top half. The second end of the Bowden cable may be positioned between the top half and the bottom half of the shuttle assembly. The rotating element may be a pulley. The cable may pass through the shuttle assembly and may nest within a groove in the rotating element.

Further optionally, the rotating element may reduce the activation force required to unlock the adjustable-length strut. The shuttle assembly may comprise a rolling element configured to translate the activation force applied on a first handle or on a second handle into a linear motion of the shuttle assembly on a track. The linear motion may be translated to a releasing force acting on a Bowden cable connected to the shuttle assembly and the adjustable-length strut such that the releasing force is more than a bias force of a locking mechanism of the adjustable-length strut. The shuttle assembly may not include a rotating element.

Further according to the present disclosure, a release assembly for releasing a lock of an adjustable-length strut is provided. The release assembly may comprise a supportive housing, a shuttle assembly, and a cable. The supportive housing may include a first handle and a second handle. The supportive housing may be configured to be positioned on a patient deck of a patient support apparatus. The shuttle assembly may be movable on a linear track on the supportive housing and may be configured to change the adjustable-length strut from a locked state to an unlocked state. The cable may run from the first handle to the second handle and may pass through a rolling element in the shuttle assembly. A first portion of the cable may be connected to the first handle and a second portion of the cable may be connected to the second handle. An activation force applied by a user on the first handle or on the second handle may be translated through the cable to the shuttle assembly causing the shuttle assembly to move in the linear track and release the lock of the adjustable-length strut. Tension may be maintained in the first portion and in the second portion of the cable when the activation force is applied by the user on the first handle or on the second handle.

If desired, a first end of a Bowden cable may be secured to the shuttle assembly and a second end of the Bowden cable may be secured to the adjustable-length strut. The shuttle assembly may comprise a bottom half, a top half covering the bottom half, and a rotating element located on a pivot pin extending from the bottom half towards the top half. The rotating element may be a pulley. The second end of the Bowden cable may be positioned between the top half and the bottom half of the shuttle assembly. The shuttle assembly may comprise a bottom half, a top half covering the bottom half, and a rotating element located on a pivot pin extending from the bottom half towards the top half. The cable may pass through the shuttle assembly and may nest within a groove in the rotating element. The shuttle assembly may comprise an element configured to translate a pull motion of the first handle or of the second handle into linear motion of the shuttle assembly. The adjustable-length strut may be a powered actuator. The adjustable-length strut may be an unpowered actuator. The adjustable-length strut may be a non-locking or a locking gas spring.

Further according to the present disclosure, a release assembly for releasing a biased locking mechanism of an adjustable-length strut is provided. The release assembly may comprise an output, at least one manual input, and means for transferring the movement of the at least one manual input to movement of the output. The output may be configured to be connected to the biased locking mechanism that induces a first tension force on the output. The at least one manual input may be configured to be moved by a user to create a second tension force in the at least one manual input. The means for transferring the movement of the at least one manual input to movement of the output may be configured to magnify the second tension force required in the at least one manual input such that the second tension force in the at least one manual input required to move the output is less than the first tension force in the output.

Optionally, the means for transferring movement of the at least one manual input to movement of the output may comprise a pulley mechanism. The pulley mechanism may comprise a pulley that rotates on a pivot pin while the pivot pin moves linearly. The linear movement of the pivot pin may be transferred to the output. The at least manual input may comprise a cable that moves over the pulley as the pulley rotates. The pulley mechanism may include a pulley that moves linearly. The output may move with the pulley. The at least one manual input may include a cable acting on the pulley when the at least one manual input is moved by the user to thereby cause rotation of the pulley and linear movement of the pulley. The cable acting on the pulley may have a first end acted upon by the user and a second end that remains stationary during movement of the at least one input. The pulley may be positioned on a pivot pin. The pivot pin may be positioned in a linear track. The linear track may define a linear path of the pulley as the at least one manual input is moved by the user. The output may move with the pivot pin.

Further optionally, the means for transferring movement of the at least one manual input to movement of the output may comprise a pulley that moves linearly. The output may move with the pulley. The at least one manual input may include a cable acting on the pulley when the at least one manual input is moved by the user to thereby cause rotation of the pulley on a pivot pin. The pivot pin may move in a linear track to define a linear movement of the pulley. The output may move linearly with the linear movement of the pulley.

Further according to the present disclosure, a patient support apparatus is provided. The patient support apparatus may comprise a support frame and a patient support deck. The patient support deck may include a thigh deck section, a calf deck section, a motion control linkage, and a variable length bias member. The thigh deck section may be pivotably coupled to the support frame at a first pivot of the thigh deck section and may be movable relative to the support frame. The calf deck section may be pivotably coupled to the thigh deck section at a second pivot of the thigh deck section. The calf deck section may have a distal end away from the thigh deck section. The motion control linkage may be engaged with the calf deck section and the support frame to control movement of the calf deck section relative to the support frame. The variable length bias member may be supported on the support frame and may apply a bias force to the thigh deck section. The variable length bias member may be movable between a first position in which the variable length bias member applies a force to the thigh deck section that secures the thigh deck section and the calf deck section in a flat configuration and a second position in which the variable length bias member causes the thigh deck section and the calf deck section to move such that the second pivot of the thigh deck section is moved vertically upwardly and the distal end of the calf deck section is positioned vertically lower than the first pivot of the thigh deck section.

Alternatively, the variable length bias member may be configured to apply the bias force directly to a side of the first pivot of the thigh deck section opposite the second pivot of the thigh deck section when thigh deck section and the calf deck section are in the flat configuration. The bias force may be configured to produce a moment about the first pivot of the thigh deck section and urge the second pivot of the thigh deck section toward the support frame. The bias member may be configured to apply the bias force directly between the first pivot and the second pivot of the thigh deck section when the variable length bias member is in the second position. The bias force may be configured to produce a moment about the first pivot of the thigh deck section and urge the second pivot of the thigh deck section away from the support frame. The bias member may be a gas spring. The patient support apparatus may further comprise an adjustable-length strut positioned between the support frame and the thigh deck section. The adjustable-length strut may be movable between a first position and a second position, and lockable at a plurality of positions therebetween. The adjustable-length strut may be movable between the first position and the second position by using a release mechanism located at the calf deck section. The adjustable-length strut may be an electric actuator.

Further according to the present disclosure, a method of positioning a calf deck section of a patient support apparatus is provided. The method may comprise applying a force on a first pivot of a thigh deck section located on a head side of the thigh deck section of the patient support apparatus. The thigh deck section may be connected to a head side of the calf deck section at a second pivot of the thigh deck section. The method may comprise producing a moment about the first pivot of the thigh deck section. The method may comprise changing a position of the calf deck section based on the force applied by a bias member connected to the thigh deck section at the first pivot.

Optionally, applying the force may comprise applying a bias force on a head side of the first pivot by the bias member. The thigh deck section may be positioned parallel to an upper frame of the patient support apparatus. Producing the moment may comprise urging the second pivot of the thigh deck section toward a support frame. Changing a position of the calf deck section may comprise pushing the second pivot downward. Applying the force may comprise applying a bias force on a calf side of the first pivot of the thigh deck section. The thigh deck section may be positioned in an articulated position compared to an upper frame of the patient support apparatus. Producing the moment may comprise urging the second pivot of the thigh deck section away from a support frame. Changing a position of the calf deck section may comprise pushing the second pivot upward. A distal end of the calf deck section may be positioned below the support frame.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
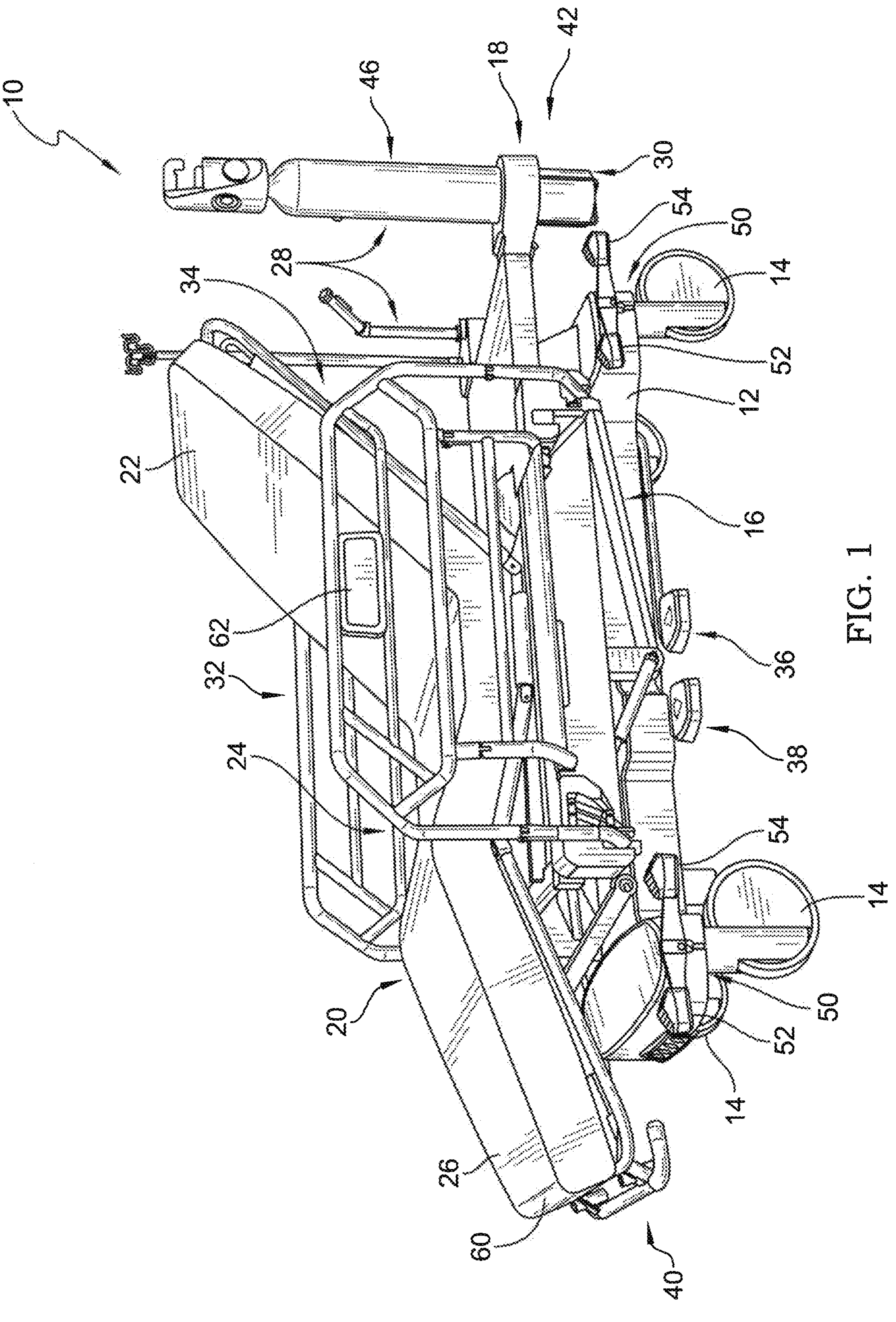
FIG. 1 is a perspective view of a first embodiment of a patient support apparatus according to the present disclosure.

According to the present disclosure, a patient support apparatus 10 shown in FIG. 1 is configurable to provide care to patients of varying acuity, while also providing improved mobility as a patient is moved between areas of a care facility, such as a hospital, for example. The patient support apparatus 10 includes a base 12 supported on four casters 14 which are lockable to prevent movement of the patient support apparatus 10 over the floor, but are oversized to provide smooth movement over the floor when released. The base 12 supports a lift assembly 16 which provides cantilevered support of an upper frame 18 and moves the upper frame 18 vertically when the lift assembly 16 is activated.

The upper frame 18 supports a patient deck 20. The patient deck 20 has multiple sections and has panels that are constructed of radiolucent material so that a C-arm x-ray device or other similar imaging devices may be used with the patient deck 20. The patient deck 20 has a pivoting head deck section 22 that pivots or moves relative to the upper frame 18. A thigh deck section 24 is also pivotable relative to the upper frame 18. A calf deck section 26 is supported from the upper frame 18 and pivotable relative to the thigh deck section 24. The calf deck section 26 is configured to move to a dependent position wherein the foot end 40 of the calf deck section 26 drops below the upper frame 18 so that the patient deck 20 may form a chair-like arrangement for patient comfort and optimal positioning. In the embodiment of FIG. 1, the patient support apparatus 10 the articulation of the calf deck section 26 and thigh deck section 24 is accomplished manually. The same is true of the head deck section 22. The articulation may be assisted by a releasable gas spring, which provides some force to assist in the movement of the sections when they are being manually manipulated. In some embodiments, the articulation may be assisted by an electric actuator.

To assist with the mobility of the patient support apparatus 10, push handles 28 are positioned at a head end 42 of the patient support apparatus 10. The push handles 28 in the embodiment of FIG. 1 are fixed to the upper frame 18 and the height of the push handles 28 is adjusted by adjusting the height of the upper frame 18 using the lift assembly 16. The patient support apparatus 10 also includes an oxygen tank holder 30 that supports an oxygen tank 46. The patient support apparatus 10 further includes a right-siderail 32 and a left-siderail 34. The orientation of the sides and ends of the patient support apparatus 10 is established by the orientation of a patient supported on the patient support apparatus 10 in a supine position such that the right-siderail 32 is positioned to the patient's right and the left-siderail 34 is positioned to the patient's left. Similarly, references to calf deck section 26 or foot end 40 related to the position of the patient's feet when in the supine position on the patient support apparatus 10. Likewise, the head end 42 is oriented at the end of the patient support apparatus 10 where a patient's head would be in a supine position.

The lift assembly 16 is operated by a raise pedal 36 that may allow a user to manually activate the raise pedal 36 so that the lift assembly 16 is raised. In some embodiments, the raise pedal 36 may require multiple activations to move the lift assembly 16, but in other embodiments, the lift assembly 16 may be powered to actuate with a single activation of the raise pedal 36. A lower pedal 38 is actuable to cause the lift assembly 16 to lower, thereby lowering the upper frame 18.

The patient support apparatus 10 includes a brake/steer mechanism supported by the base 12. The brake/steer mechanism is of the type known in the art and able to transition the operation of the casters 14 between a full lock that prevents rotation of the wheels of the caster 14 and prevents swiveling of the caster 14 about a vertical axis, a neutral position in which the casters 14 are free to rotate and swivel, and a steer position in which at least one of the casters 14 is locked in swivel to serve as a tracking wheel to assist with steering of the patient support apparatus 10. In the present embodiment, the caster 14 positioned at the left foot end of the patient support apparatus 10 serves as the steer caster. In other embodiments, a different caster 14 may be placed in steer. The activation of the brake/steer mechanism is provided by an actuator 50 which is positioned at each caster 14, each actuator 50 having a brake pedal 52 and a steer pedal 54 as is known in the art. This allows a caregiver to actuate the brake/steer mechanism at multiple positions about the periphery of the patient support apparatus 10.

Notably, the patient support apparatus 10 further includes a support cushion assembly or mattress 60 supported on the patient deck 20 and movable with the patient deck 20 to conform to the deck in multiple positions. Additionally, the patient support apparatus 10 includes a user interface 62 that operates a scale system 286 built into the patient support apparatus 10 as is known in the art.

Figure 2A:
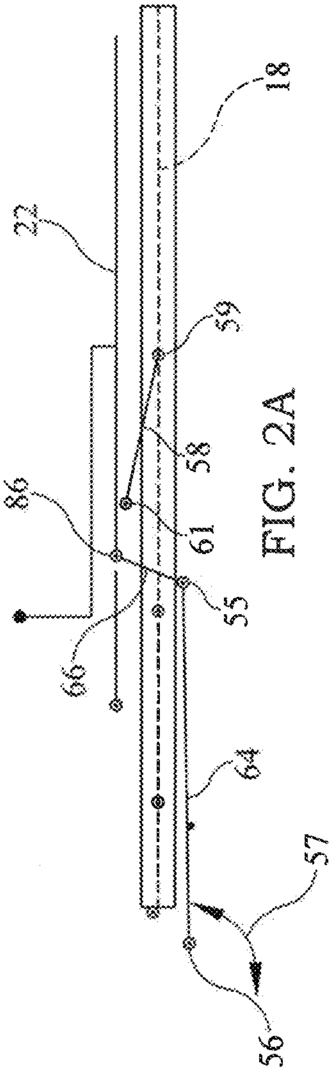
FIG. 2A is a kinematic diagram of a portion of the embodiment of FIG. 1 showing the relationship of portions of the head deck in a lowered position.
Figure 2B:
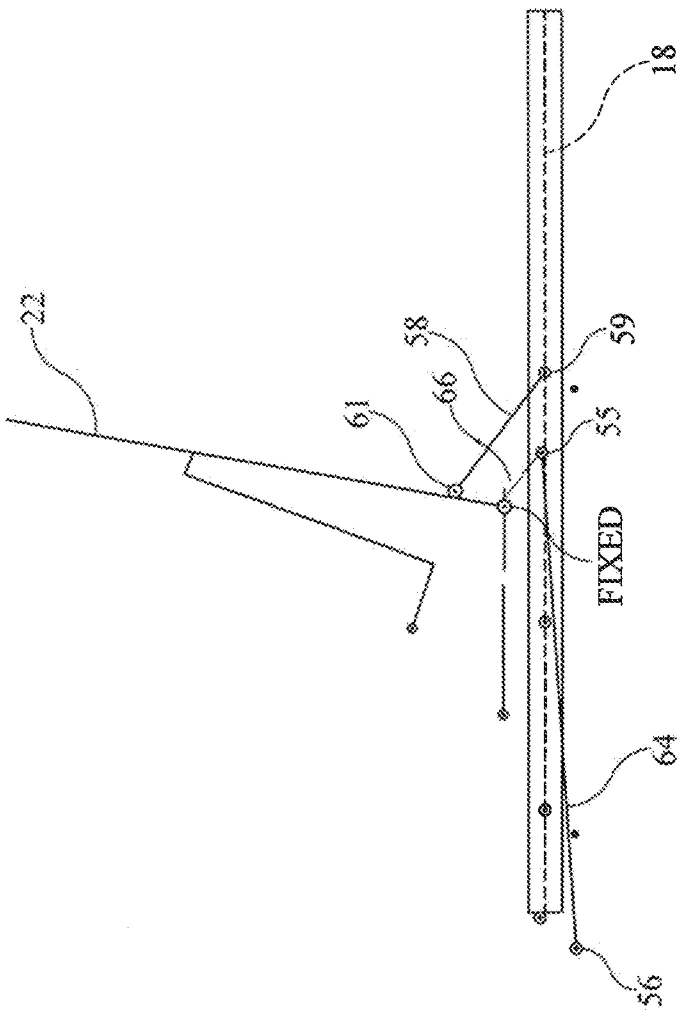
FIG. 2B is a kinematic diagram similar to FIG. 2B showing the relationship of portions of the head deck in a raised position.

Referring now to FIGS. 2A and 2B, the kinematic functionality of the movement of the head deck section 22 is shown with a lowered position shown in FIG. 2A and a raised position shown in FIG. 2B. The head deck section 22 is moved by a releasable actuator 64 which is pinned to the upper frame 18 at a pivot 55, the actuator 64 pivotable about pivot 56 as indicated by the arrow 57. The actuator 64 is pivotably coupled to a crank arm 66 at the pivot 55. The crank arm 66 is fixed to the head deck section 22 and the two move together. The actuator 64 is pivotable relative to the crank arm 66 at the pivot 55. A compression link 58 is pivotably coupled to the upper frame 18 at a pivot 59 and pivotably coupled to the head deck section 22 at a pivot 61. In operation, the actuator 64 is extended and acts on the crank arm 66. The compression link 58 reacts to the movement to cause pivoting about the pivot 61 which effectively causes the crank arm 66 and head deck section 22 to pivot relative to the actuator 64, thereby raising the head deck section 22 as shown in FIG. 2B. Notably, this causes the head deck section 22 to move in a direction parallel to the upper frame 18. This motion mimics a sliding motion which tends to reduce the shear imparted on the back of a patient during the movement.

Figure 4:
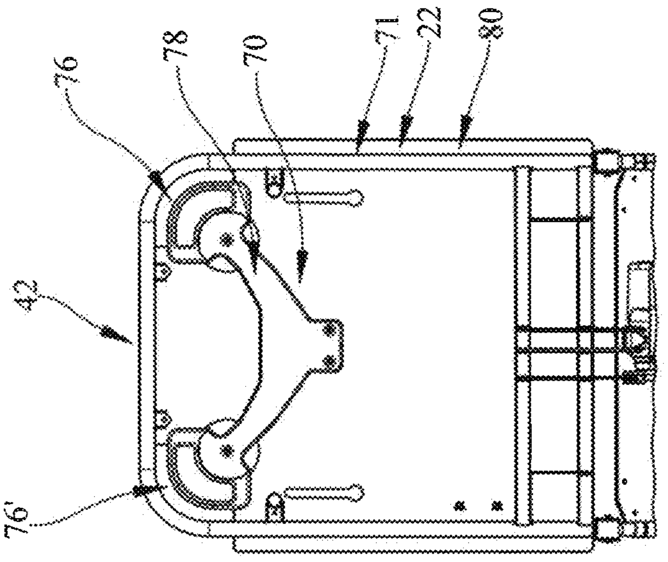
FIG. 4 is an illustration of the location of the releasing assembly in relation to the patient support surface of the patient support apparatus.
Figure 3:
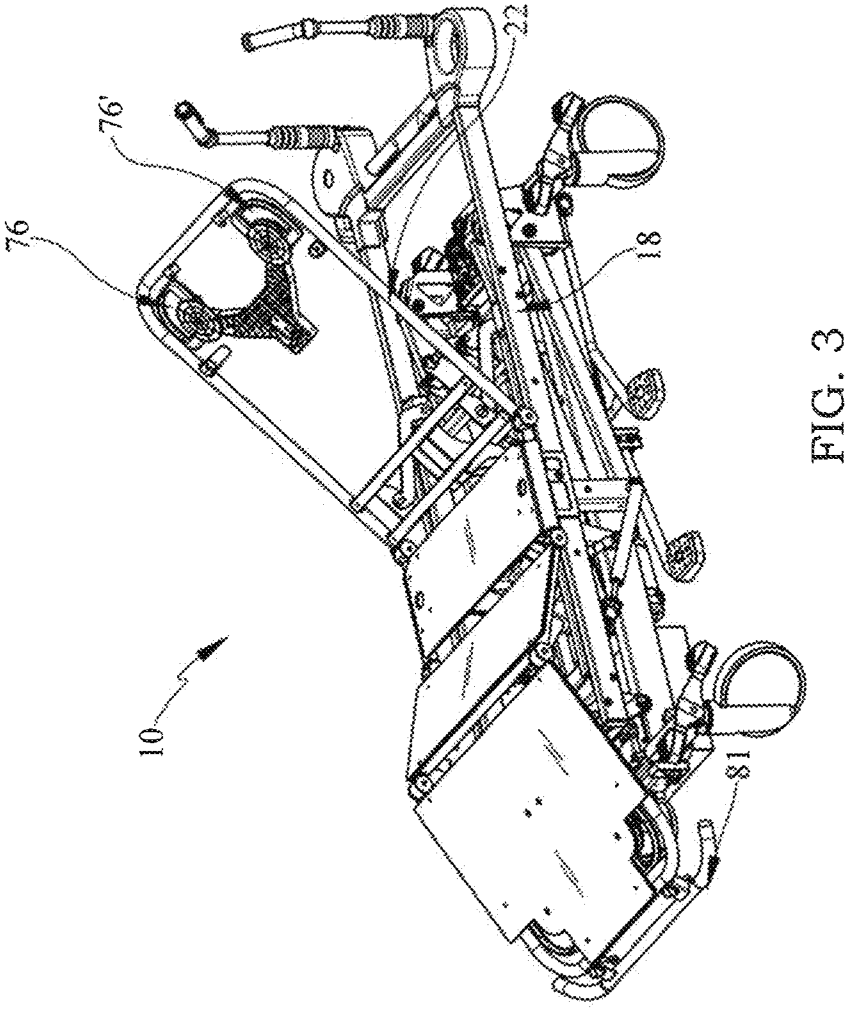
FIG. 3 is an illustration of patient support apparatus showing a releasing assembly operable including an adjustable-length strut 72.
Figure 5:
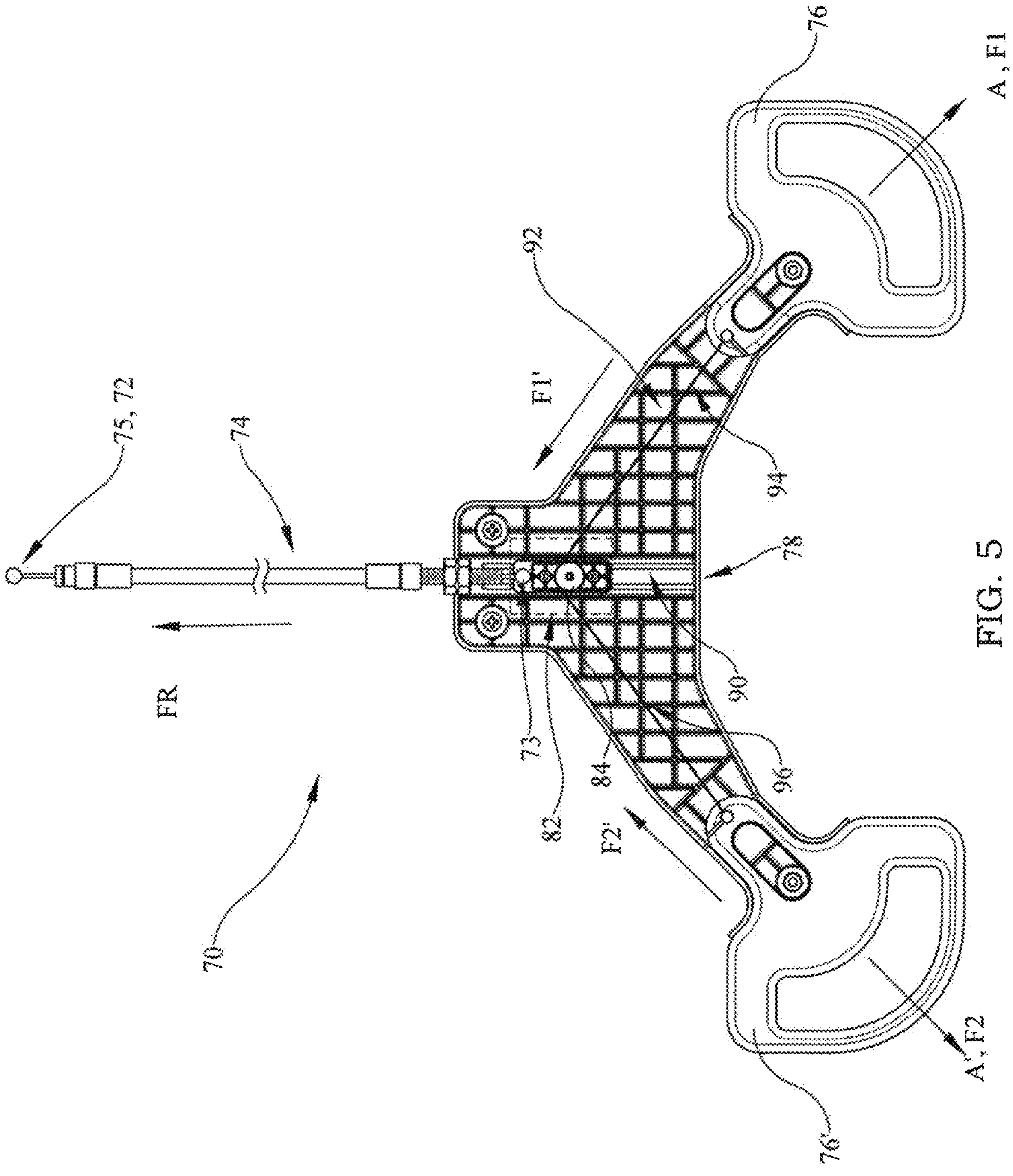
FIG. 5 is an illustration of the location of the releasing assembly connected to an adjustable-length strut operable to change the position of the patient support surface of the patient support apparatus.

The patient support apparatus 10 includes a releasing assembly 70 shown in FIGS. 3-7. Referring to FIG. 4, the releasing assembly 70 is mounted to a head deck pan 71 which is omitted in FIG. 3 to show details of the releasing assembly 70. The releasing assembly 70 is a modular articulation device 70 connected to the head deck section 22 that assists in the raising and lowering of the head deck section 22 by releasing a locking mechanism 72 of the actuator 64 as is known in the art. The locking mechanism 72 may be a mechanical locking strut 72. In the present embodiment, the actuator 64 is a locking gas spring. In other embodiments, the actuator 64 may be a non-locking gas spring. In other embodiments, the actuator 64 may be a hydraulic cylinder or electric actuator with a mechanical release. The releasing assembly 70 is configured to move the locking mechanism 72 between a first locked position and a second unlocked position. The locking mechanism 72 is releasable and lockable such that the actuator 64 is lockable at any position to position the head deck section 22 in any position between the fully raised position of FIG. 2B and the fully lowered position of FIG. 2A. The releasing assembly 70 includes pull handles 76, 76' connected to a supportive housing 78. The releasing assembly 70 is positioned on a bottom surface 80 of the head deck pan 71 so that the pulling handles 76, 76' are positioned at the head end 42 of the patient deck 20 as shown in FIG. 4.

Figure 19:
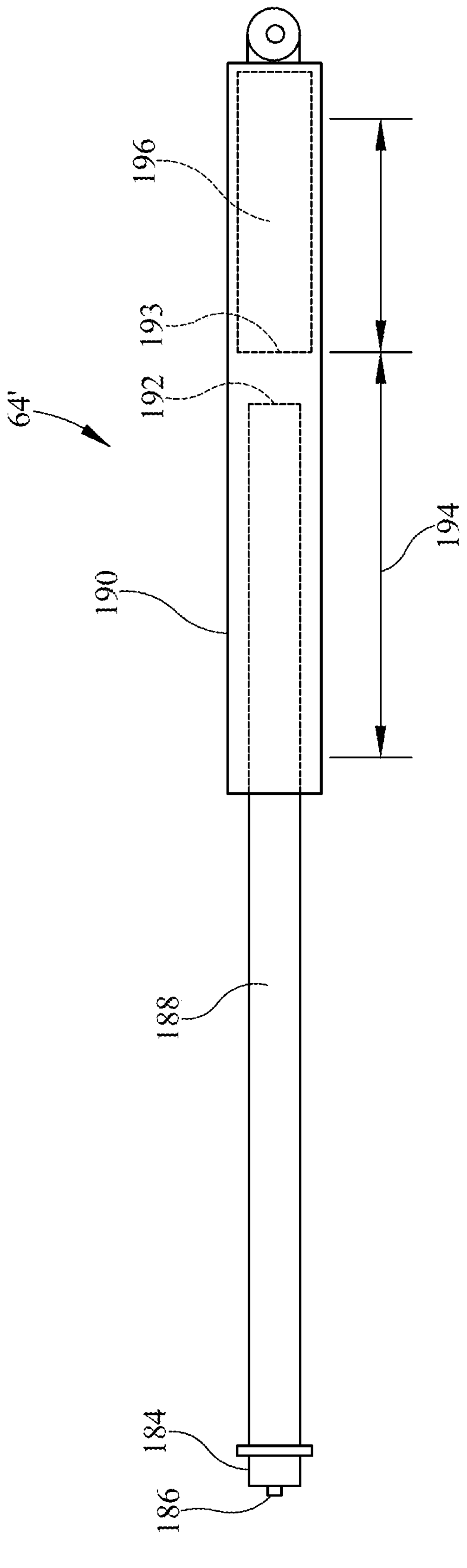
FIG. 19 is a diagrammatic view of a gas spring having a first spring rate through a first distance of displacement of a rod of the gas spring and a second spring rate through a second distance of displacement of the rod.

In some embodiments, the actuator 64 may be embodied as a gas spring having a variable spring rate. Referring to FIG. 19, a diagrammatic representation shows an example of a gas spring structure designated as gas spring 64' has an extension mount 184 which may be mounted through any of a number of structures. The gas spring 64' includes a release 186 which is acted upon to cause an internal lock in the gas spring 64' to be released to allow a rod 188 to move relative to a cylinder 190. An end 192 of the rod 188 moves over a first distance 194 which has a spring bias that increases at a first rate as the rod 188 moves from a fully extended position over the distance 194 until the end 192 of the rod 188 contacts an end 193 of a mechanical spring 196. The mechanical spring 196 has an increased spring rate such that as additional movement of the rod end 192 over the distance 198 results in higher bias against acting on the rod 188, and, therefore, the head deck section 22. It should be understood that the structure of gas spring 64' may be implemented in the patient support apparatus embodiments of the present disclosure to provide varying bias in certain applications. Additionally, the mechanical spring 196 may comprise multiple springs having different spring rates or a single spring having a variable spring rate to accommodate varying applications. Similarly, the distances 194 and 198 may be varied depending on the application.

The locking mechanism 72 is biased to a locked state is acted upon by a sleeved cable 74 (e.g., a Bowden cable 74), and the Bowden cable 74 is configured to transfer any activation force applied on the pulling handles 76, 76' to the locking mechanism 72 to move the locking mechanism 72 to a released state. When the locking mechanism 72 is released, the Bowden cable 74 moves and the head deck section 22 of the patient deck 20 is movable about the upper frame 18.

Figure 6B:
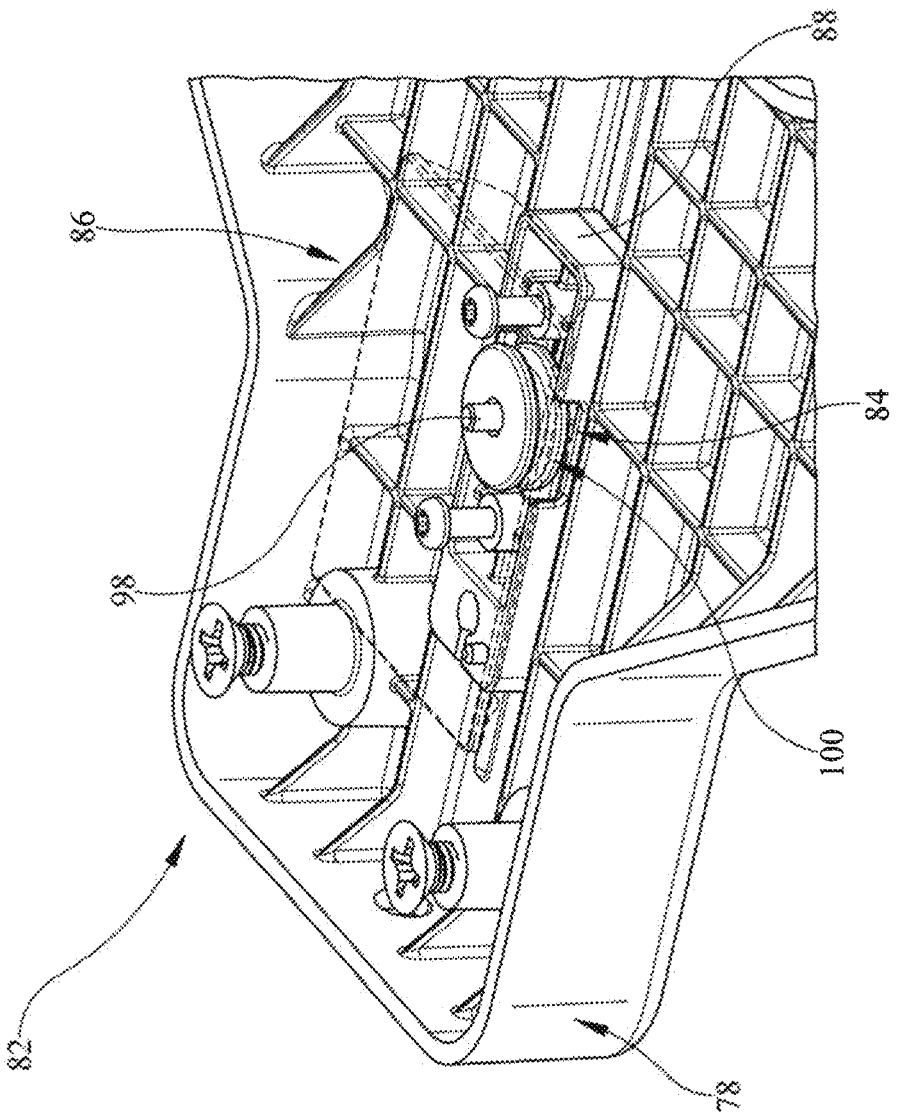
FIG. 6B is an illustration of the shuttle assembly as positioned on a supportive housing of the releasing assembly.

The releasing assembly 70 includes a shuttle assembly 82 comprising a rolling element 84 positioned on the supportive housing 78 as shown in FIG. 6B. A proximal end 73 of the Bowden cable 74 is connected to the shuttle assembly 82 while a distal end 75 of the Bowden cable 74 is connected to the locking mechanism 72. The Bowden cable 74 is maintained in a fixed position by locking the locking mechanism 72 which applies a tension force to the Bowden cable 74.

The shuttle assembly 82 is configured to move on a track 90 (see FIG. 5) when an activation force F1, F2 is applied by a user on one of the pull handles 76, 76' respectively. A cable 92 connects the pulls handles 76, 76' and passes through the rolling element 84 in the shuttle assembly 82. The cable 92 includes a first end 94 connected to the first pull handle 76 and a second end 96 connected to the second pull handle 76'. Since the cable 92 is connected to the rolling element 84, tension in the first end 94 of the cable 92 ($T_1$) and tension in the second end 96 of the cable 92 ($T_2$) is maintained even when the activation force $F_1$, $F_2$ is applied on only one of the pull handles 74, 76.

The activation force $F_1$, $F_2$ is transferred to the shuttle assembly 82 as reactive forces F1', F2' through the cable 92, and further transferred to the Bowden cable 74 as a releasing force $F_R$. Upon application of a required amount of releasing force $F_R$, the locking mechanism 72 is unlocked from the lockable position and the patient deck 20 is movable. If the releasing force $F_R$ is more than a bias force $F_B$ of the locking mechanism 72, the locking mechanism 72 is unlocked.

The activation force $F_1$, $F_2$ determined the releasing force acting of the locking mechanism 72. Due to the pulley effect created by the rolling element 84, the activation force $F_1$, $F_2$ required to be applied by the user to activate the releasing force $F_R$ is less than the force applied by the user that would result in the required releasing force $F_R$ if the patient deck 20 included two separate Bowden cables 74, where each Bowden cable 74 was separately connected to one pull handle 76, 76'. The activation force $F_1$, $F_2$ may be applied by the user along directions A, A' shown in FIG. 5. Alternatively or additionally, the activation force $F_1$, $F_2$ may be applied by the user by moving the pull handles 74, 76 in any other direction allowable by the configuration of the pull handles 76, 76'.

Figure 6A:
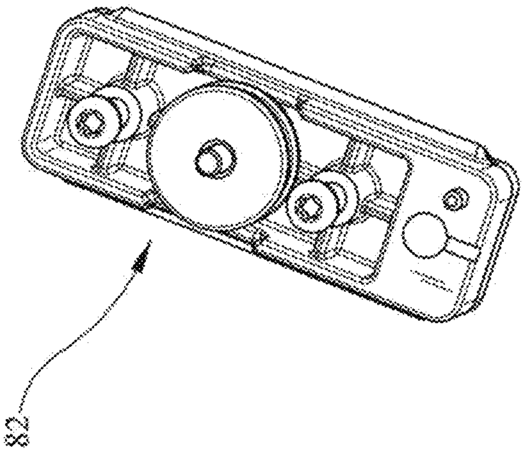
FIG. 6A is an illustration of the shuttle assembly of the releasing assembly including a rolling element positioned on a pivot pin.

As shown in FIGS. 6A and 6B, the shuttle assembly 82 includes a top half 86 attached to a bottom half 88. The shuttle assembly 82 further includes the rolling element 84 positioned on a pivot pin 98. The pivot pin 98 moves linearly on the track 90. In the illustrative embodiment, the rolling element 84 is a pulley 84. The cable 92 is positioned in a groove 100 in the pulley 84. In some embodiments, the shuttle assembly 82 may not include a rolling element 84. However, the presence of the rolling element 84 reduces friction on the cable 92, thus further reducing the amount of activation force $F_1$, $F_2$ needed to unlock the locking mechanism 72.

Figures 7A, 7B:
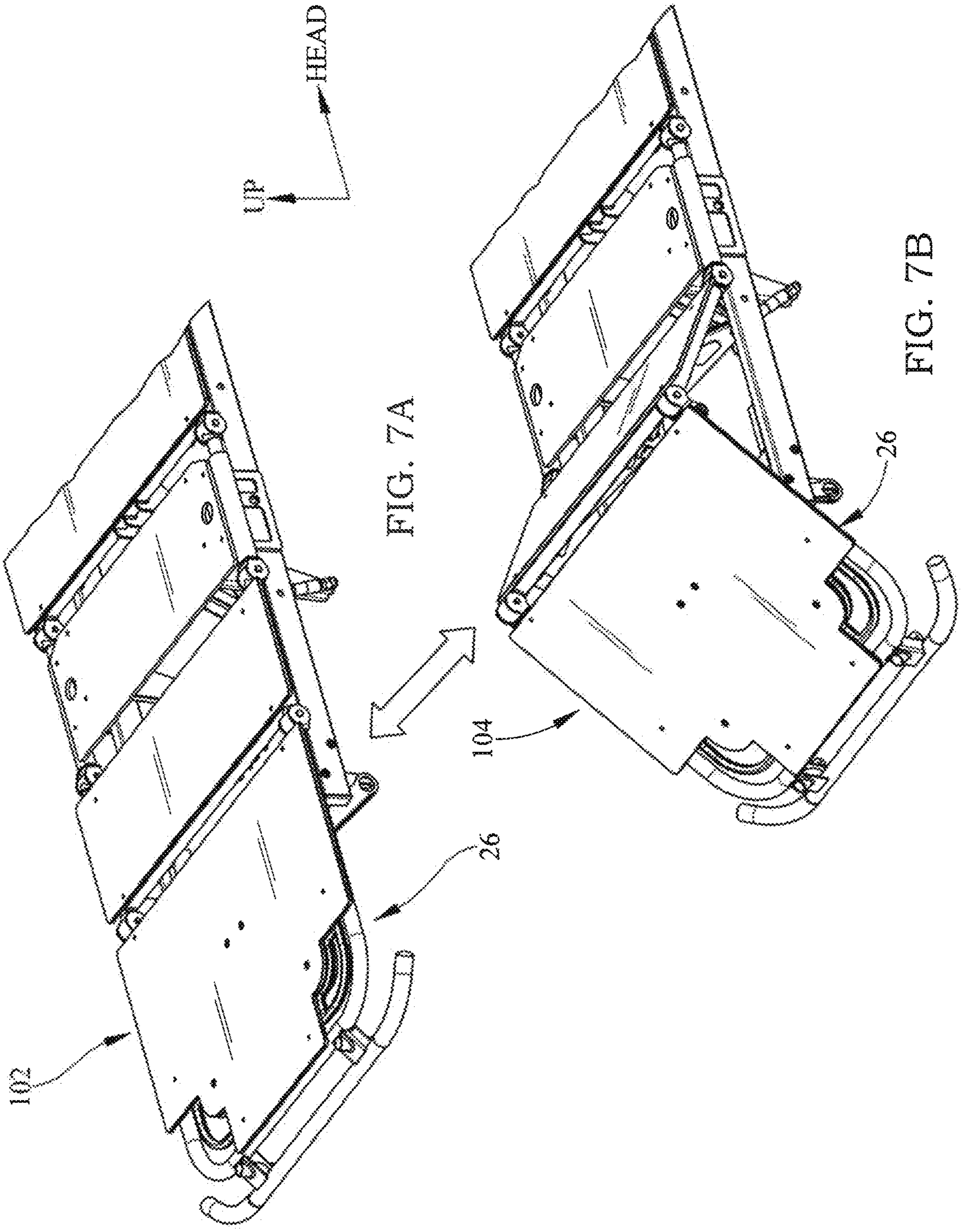
FIG. 7A is an illustration of the patient support surface of the patient support apparatus in a flat position.
FIG. 7B is an illustration of the patient support surface of the patient support apparatus in a fully articulated position.

Referring now to FIGS. 7A-12. The calf deck section 26 can be manually positioned based on the patient position and need. However, a prior art articulating calf deck section 26 has two limitations. First, when the calf deck section 26 is at or near the flat position 102 as shown in FIG. 7A, a user has to hold the calf deck section 26 up while simultaneously releasing an articulation hand control. This may lead to the calf deck section 26 dropping a little bit after the hand control is released and resulting in the calf deck section 26 not being completely flat. Secondly, the user has to push down and apply a downward input force at an end of the calf deck section 26 in order to articulate or lower the calf deck section 26. Typically, this input force increases while going from the flat position 102 shown in FIG. 7A to a fully articulated position 104 shown in FIG. 7B.

This disclosure is directed to an over-center calf deck section 26 mechanism that assists the user and overcomes the aforementioned limitations pulling or holding calf deck section 26 up when at or near the flat position 102, reducing the amount of input force needed to articulate the calf deck section 26, and self-retracting the calf deck section 26 down when the calf deck section 26 is at or near the fully articulated position 104.

Figure 8:
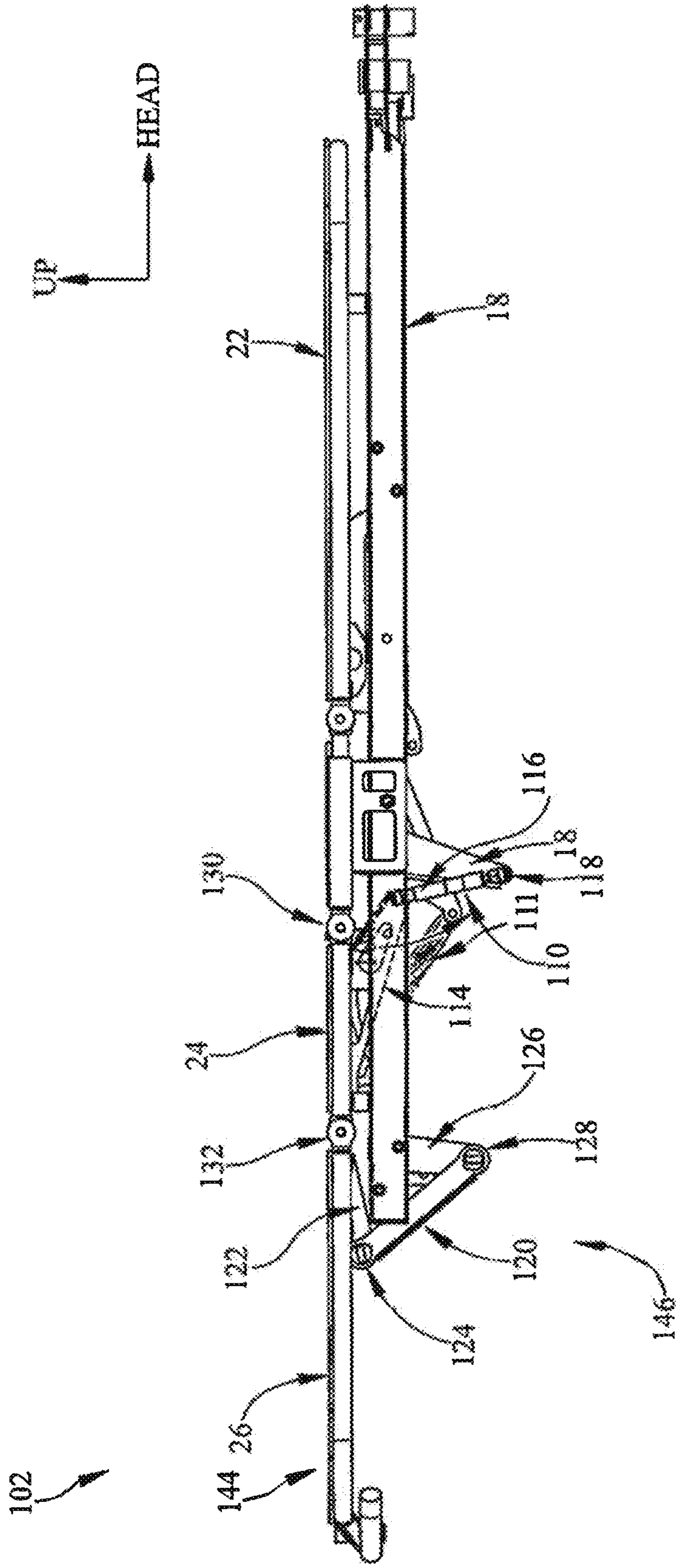
FIG. 8 is a side view of different sections of the patient support surface in the flat position.
Figure 9:
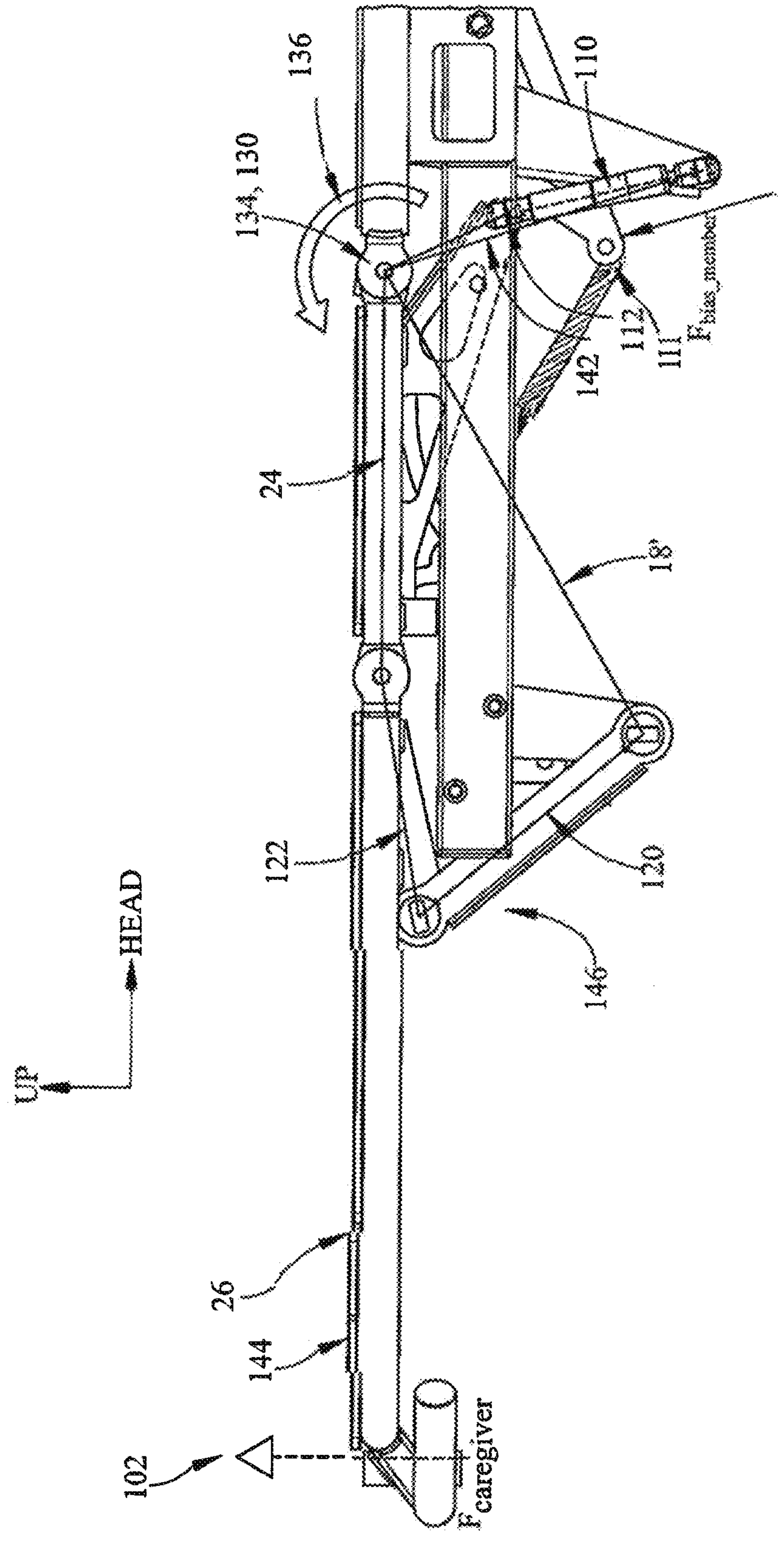
FIG. 9 is an illustration showing a calf deck section mechanism including the direction of a bias force of a bias member when the patient support surface is in the flat position.

Referring now to FIGS. 8 and 9, the kinematic functionality of the movement of the thigh deck section 24 and calf deck section 26 is illustrated. The movement of the thigh deck section 24 and calf deck section 26 is managed by a variable length bias member or an actuator 110 which is pivotably coupled to the thigh deck section 24 at a pivot 112. An adjustable length strut 111 between the upper frame 18 and the thigh deck section 24 is used to manage the motion of the thigh deck section 24 and calf deck section 26. The thigh deck section 24 is pivotably coupled to the actuator 110 with a thigh section arm 114 at the pivot 112. The actuator 110 is pivotably coupled to a first frame arm 116 of the upper frame 18 at a pivot 118. The calf deck section 26 includes a distal end 144 away from the thigh deck section 24 that can be vertically positioned relative to the upper frame 18.

The adjustable length strut 111 may be an electric actuator 111, a mechlok 111, or a similar device. The adjustable length strut 111 can be a locking or an unlocking adjustable length strut 111. The adjustable length strut 111 is movable between a first position and a second position, and lockable at a plurality of positions therebetween. The caregiver can release the adjustable strut 111 with a release mechanism 81 shown in FIG. 3. The adjustable strut 111 and the release mechanism 81 is configured to operate similarly to the locking mechanism 72 and the pull handles 76, 76'. The adjustable length strut 111 may be a linear actuator 111 configured for quick release if the calf deck section 26 was part of an electric stretcher 10. The normal operation would be electrically driven by the linear actuator overcoming the moments created by bias member 110 as the motion goes from the flat position 102 to a fully articulated position 104. If the electric stretcher 10 was without power, the caregiver would release the linear actuator 110 with the release mechanism 81 shown in FIG. 3.

The motion of the calf deck section 26 is managed by a motion control linkage 146. The motion control linkage 146 includes a calf link 120 such that the calf deck section 26 is pivotably coupled to a calf link 120 by a calf section arm 122 at a pivot 124 and the calf link 120 is also pivotably coupled to a second frame arm 126 fixed to the upper frame 18 at a pivot 128. The thigh deck section 24 pivots relative to the upper frame 18 at a seat section pivot 130 and the calf deck section 26 pivots relative to the thigh deck section 24 at a calf section pivot 132.

The bias member 110 applies a force to the thigh deck section 24 that secures the thigh deck section 24 and calf deck section 26 in the flat configuration 102 and a second position in which the bias of the bias member 110 causes the thigh deck section 24 and calf deck section 26 to move to a second position in which the calf section pivot 132 is moved vertically upward and the thigh deck section 24 is in the fully articulated position 104.

In one embodiment, as shown in FIGS. 8-11, the bias member 110 is embodied as a gas spring. Movement of the calf deck section 26 can be described through reference to various components as parts of a linkage. The thigh deck section 24 acts as an output link 24, the calf link 120 acts as an input link 120, the upper frame 18 acts as a ground link 18', and the calf section arm 122 coupling the input link 120 and the output link 24, acts as a floating link 122, in a four-bar linkage system constrained to articulate the calf deck section 26. The links 24, 120, 122, and 18' form a parallelogram structure that controls movement of thigh deck section 24 and the calf deck section 26 in a generally vertical manner and with minimal swing, thereby limiting horizontal movement. In other embodiments, the gas spring 110 may be omitted and replaced with a compression spring. In still other embodiments, a leaf spring may be used to act on the parallelogram structure to provide articulation. In other embodiments, a torsional spring, or multiple torsional springs, may be applied to the seat section pivot 130 to manage articulation of the thigh deck section 24 and the calf deck section 26.

A bias force ($F_{bias\_member}$) acts on a first side or head side 134 of the seat section pivot 130 to the right of a neutral axis 142 aligning the bias member 110 and the seat section pivot 130 (as seen from the patient left-side of the frame) when the thigh deck section 24 is in a flat or near flat position 102 as shown in FIGS. 7A, 8, and 9. The bias force ($F_{bias\_member}$) of the bias member 110 acts in a direction to cause the bias member 110 to extend. When acting on the first side or the head side 134 of the seat section pivot 130, the bias force ($F_{bias\_member}$) produces a counterclockwise moment 136 about the seat section pivot 130. The counterclockwise moment 136 pushes the thigh deck section 24 down against the upper frame 18, which, in turn, pulls the calf deck section 26 upwards as shown in FIG. 9 due to the kinematic constraints of the system of links. A caregiver does not have to physically hold the calf deck section 26 up while they release the calf deck section 26 hand controls.

Figure 10:
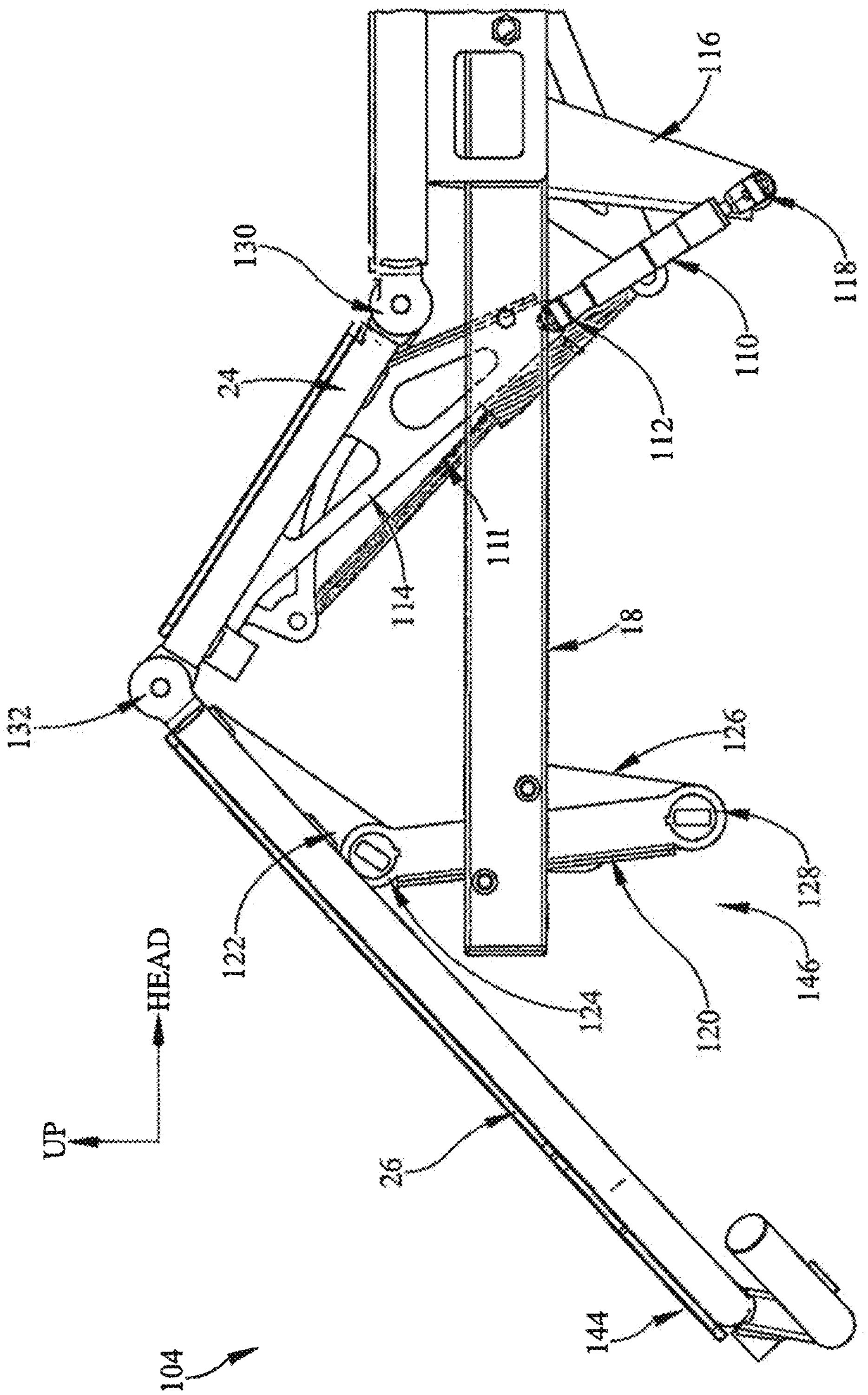
FIG. 10 is a side view of different sections of the patient support surface in the fully articulated position.
Figure 11:
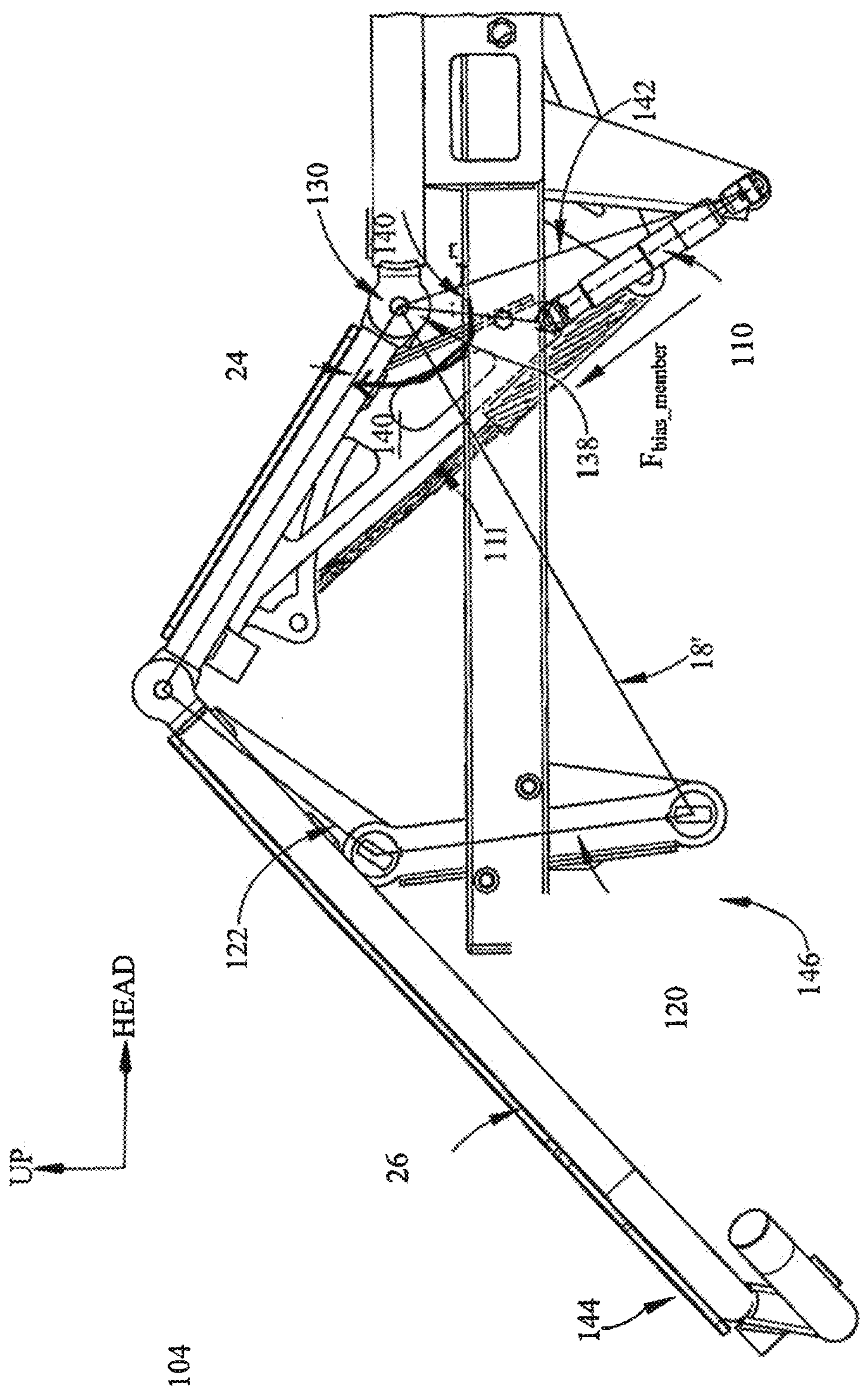
FIG. 11 is an illustration showing a calf deck section mechanism including the direction of a bias force of a bias member when the patient support surface is in the fully articulated position.

To get the thigh deck section 24 at or near the fully articulated position 104 as shown in FIGS. 7B, 10, and 11, the bias force of the gas spring ($F_{bias\_member}$) acts on a second side or a calf deck side 138 of the seat section pivot 130 to the left of the neutral axis 142 aligning the bias member 110 and the seat section pivot 130 (as seen from the patient left-side of the frame). When acting on the second side or foot side 138 of the seat section pivot 130, the bias force ($F_{bias\_member}$) produces a clockwise moment 140 about the seat section pivot 130 as seen in FIG. 11. The clockwise 140 moment pushes the thigh deck section 24 up, which, in turn, pulls the calf deck section 26 in (i.e., self-retraction) as shown in FIG. 11 due to the kinematic constraints of the system of links. The distal end 144 of the calf deck section 26 is positioned below the plane of the upper frame 18 and below the seat section pivot 130. The caregiver has to exert less force downward to overcome a bias force of the bias member 110 and to position the calf deck section 26 into the fully articulated position 104.

It should be understood that the bias member 110 may take various forms within the spirit of this disclosure. For example, the bias member 110 may be powered or unpowered. In some embodiments, bias member 110 may be an electrically driven screw drive actuators or hydraulic cylinders. In other embodiments, they may be releasable gas springs. The bias member 110 may be replaced with another telescopic structure, such as electrically driven screw drive actuator. When a releasable gas spring is used, the gas spring may provide support lift assist support. In some embodiments, the gas spring 110 may be configured to have a variable spring rate as described above with regard to the gas spring 64' of FIG. 19.

Figure 12:
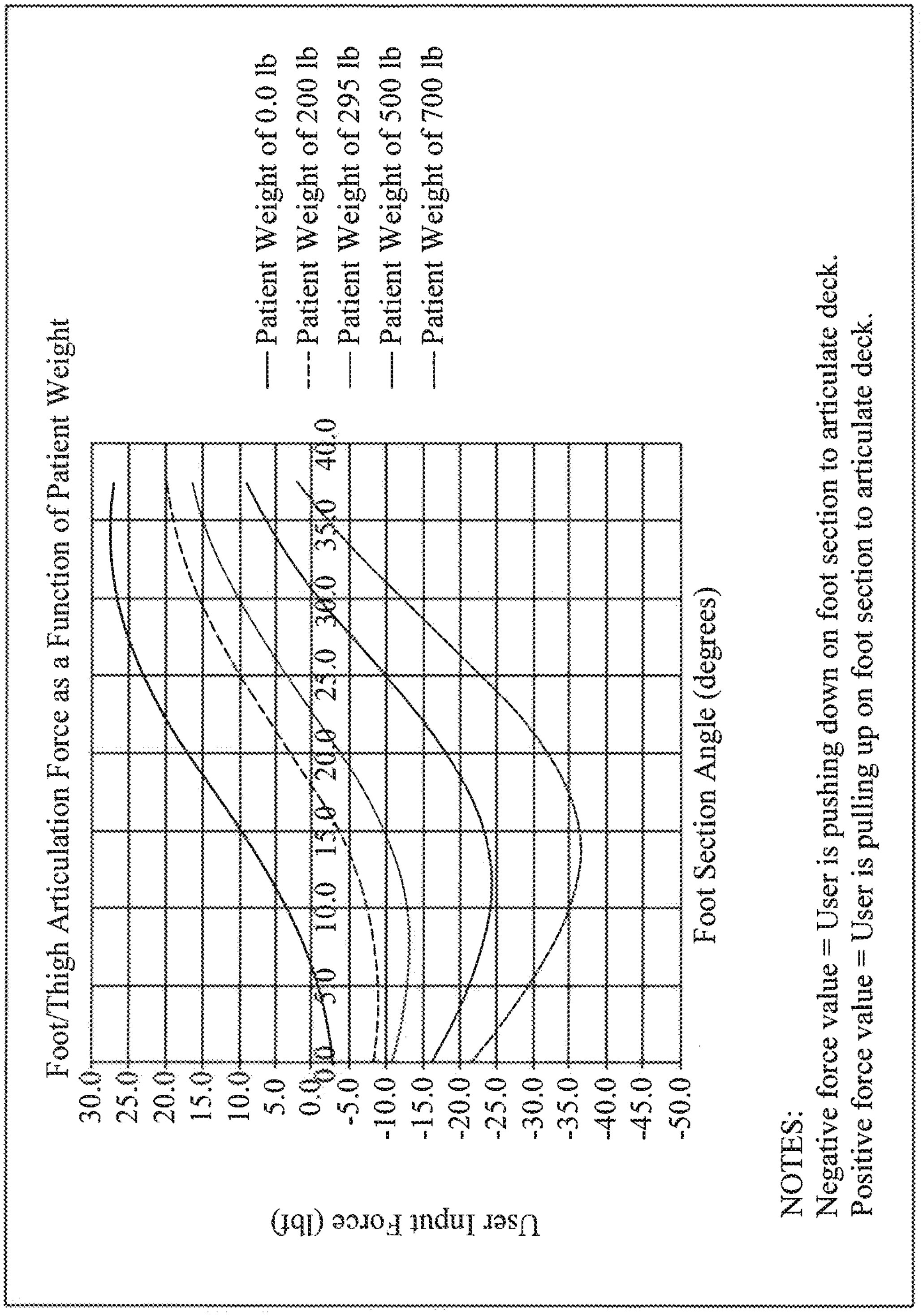
FIG. 12 is a graph showing the articulation force of the calf deck section mechanism, over the calf deck section's entire range of motion, as a function of patient weight.

FIG. 12 is an illustration capturing the articulation force of the aforementioned calf deck section mechanism, over the calf deck section's 26 entire range of motion, as a function of patient weight. The calf deck section mechanism is designed and tuned to pull/hold the calf deck section 26 up when at or near the flat position 102, reduce the amount of effort needed to articulate the mechanism, and self-retract/hold the calf deck section 26 down when at or near the fully articulated position 104.

Figure 13:
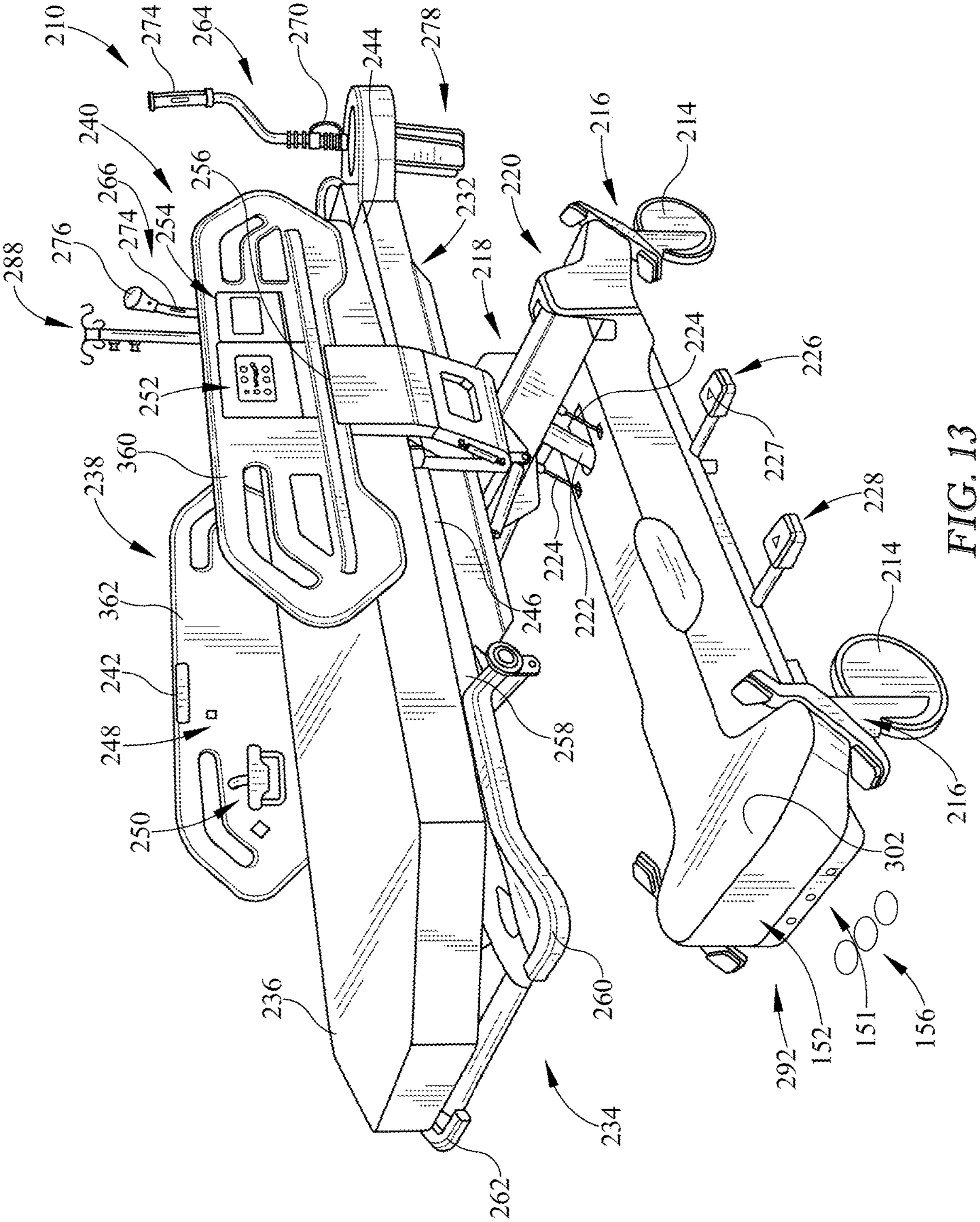
FIG. 13 is a perspective view of another embodiment of a patient support apparatus.

Referring now to FIG. 13, another embodiment of a patient support apparatus 210 is similar to the embodiment of FIG. 1. The patient support apparatus 210 includes a lower frame 212 supported on a plurality of casters 214. The casters 214 are lockable against rotation and swiveling by petals 216 as is known in the art. The lower frame 212 supports a lift mechanism 218 which is supported near a head end 220 of the lower frame 212. The lift mechanism 218 is operated by a hydraulic cylinder 222 that is assisted by a pair of gas springs 224 as the lift mechanism 218 moves from its lowest position shown in FIG. 20 and described in further detail below. The gas springs 224, 224 are not required provide additional assistance as the lift mechanism 218 raises as the lift mechanism 218 overcomes, or moves through, a position of mechanical disadvantage as it raises from the lowest position toward a fully raised position, such as that shown in FIG. 13. The hydraulic cylinder 222 is operated by a pedal assembly 226 which may be acted upon by a user with the foot to pump hydraulic fluid from a reservoir into the hydraulic cylinder 222 to cause the hydraulic cylinder to extend and affect the movement of the lift mechanism 218. In the present embodiment, the hydraulic cylinder 222 is a single acting cylinder. In some embodiments, the hydraulic cylinder 222 may be powered by a hydraulic pump to cause the hydraulic cylinder 222 to extend. Such a system is disclosed in US20230107717A1 which is titled "PATIENT SUPPORT APPARATUS WITH A HYDRAULIC LIFT HAVING POWERED AND MANUAL MODES," which published Apr. 6, 2023 and which is incorporated herein in its entirety. To lower the lift mechanism 218, a pedal 228 may be activated by a user to open a release valve between the hydraulic cylinder and the reservoir to allow hydraulic fluid to be urged into the reservoir by the weight of the structure supported on the lift mechanism 218. In some embodiments, the gas springs 224 may be configured to have a variable spring rate as described above with regard to the gas spring 64' of FIG. 19.

Figure 14:
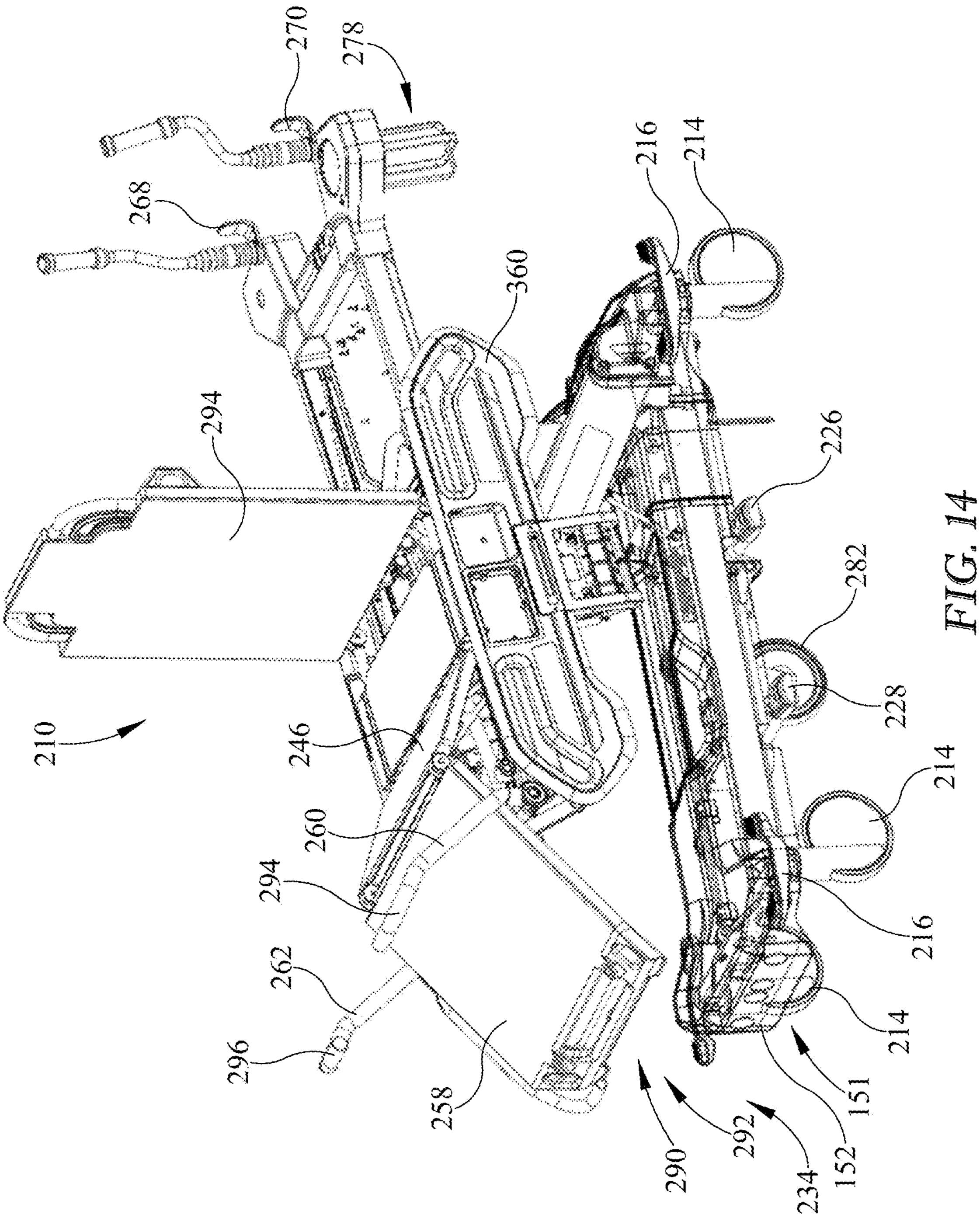
FIG. 14 is a perspective view of yet another embodiment of a patient support apparatus.

The lift mechanism supports an intermediate frame 230 (not shown in FIG. 13) that supports an upper frame 232. The upper frame 232 supports the components of a deck assembly 234, the deck assembly 234 configured to support a mattress 236. The upper frame 232 also supports a pair of siderails 238 and 240. The siderails 238, 240 are shown in raised positions in FIG. 13, but may be lowered as shown in FIG. 14, for example. Throughout the remainder of the discussion of various embodiments of patient support apparatuses according to this disclosure, several components which are optional in nature relative to the complexity of the patient support apparatus, will be discussed and identified as optional. It should be understood that a basic version of the disclosed patient support apparatuses could be totally manual without any electrical components. Still further, there are many options which may be added to increase the capabilities of the patient support apparatus. The variations in complexity are provided to allow the patient support apparatus to be configured for a particular use case, such as being a simple transport stretcher with limited to no complexity, up to a level of complexity that is similar to that of a standard hospital bed and appropriate to be used in procedural applications, or as part of an observation unit where patients are kept for a period of time before being discharged or admitted.

Figure 15:
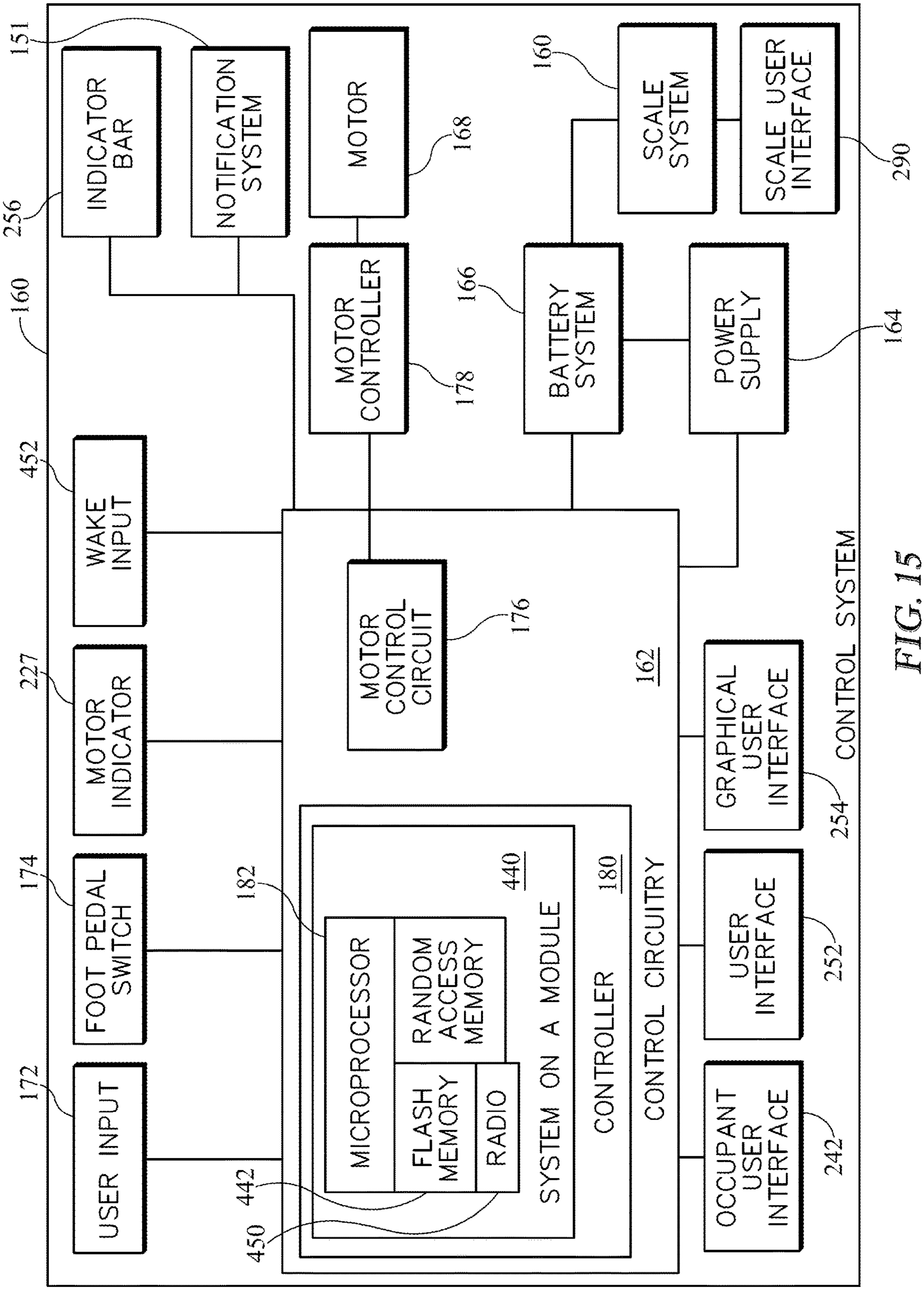
FIG. 15 is a block diagram of an embodiment of a control system suitable for use with patient support apparatuses of the present disclosure.

Referring now to FIG. 15, a diagrammatic representation of a control system 160 suitable for the patient supports of the present disclosure is shown. While some embodiments of the patient support apparatuses disclosed herein are completely manual, the control system 160 is modular, allowing various functions to be interchangeably included with the control system 160 to adapt the patient support apparatus to various use cases and functionality as required for the particular use. When present, the control system 160 will include at least control circuitry 162 that is operable to perform elementary logical operations, a power supply 164 operable to connect to mains power external from the control system, and a battery system 166 operable to provide power to components of the control system 160. In a simple embodiment, the control system 160 includes a motor 168 operable to operate a lift actuator 222 and a user input 172 operable to receive an input from a user and transfer an input signal to the control circuitry to cause the motor 168 to operate to cause the lift actuator 170 to act on the lift mechanism 218, for example. In some embodiments, the presence of the motor 168 may be indicated by an illuminated indicator 227 shown positioned on pedal 226 in FIG. 13 and in the control system 160 in FIG. 15. The presence of the illuminated indicator 227 provides an indication to a user that the powered capability is present. In some embodiments, the user input 172 may be a foot pedal switch 174 that is activated by the foot pedal assembly 226 in certain conditions. For example, the foot pedal switch 174 may be mounted in a location that causes the motor 168 to activate when the foot pedal 226 is fully depressed. In other embodiments, the foot pedal switch 174 may be activated throughout the stroke of the foot pedal 226. In other embodiments, the user input 172 may be positioned a user interface 242 or a graphical user interface 254 positioned on a siderail 238. In some embodiments, the control circuitry 162 may include a motor control circuit 176, such as a relay or H-bridge, that is operable to transfer power from the power supply 164 to a motor controller 178 to control the motor 168.

In more complex embodiments, the control system 176 may include a controller 180 that includes a microprocessor 182 that is operable to perform logic for other components of the control system. In some embodiments, the controller 180 includes a microprocessor based system on a module (SOM) 440, and wherein the SOM 440 is operable to transition into a low power mode wherein the microprocessor 182 stops operation and to return from the low power mode by operating an executable file that was being processed by the microprocessor beginning at the same instructions being executed at the time the SOM 440 transitioned to the low power mode. To accomplish this low power mode, the SOM 440 is operable to write the state of the execution file to flash memory 442 and stop the operation of the microprocessor when the SOM 440 enters the low power mode. The execution file is reloaded to a microprocessor 182 random access memory 444 when the SOM 440 exits the low power mode. In some embodiments, the SOM 440 may comprise a DART-MX8M-PLUS V1.x available from Variscite Ltd, of Airport City, Israel. The SOM 440 may include wireless functionality including a wireless radio 450 having portions that may be stopped under certain conditions. The SOM 440 includes functionality that the radio 450 to monitor for a particular message directed to the radio 450 of the SOM 440 and the radio 450 is restarted when the particular message is received. SOM 440 is operable to receive a signal from a user input 172, 174, 242, 252, 254 290, causing the SOM 440 to exit the low power mode. In some embodiments, a separate user input 452 may be dedicated to waking the SOM 440.

In some embodiments, the control circuitry 162, including the SOM 440 may be configured to communicate bed status data and alerts to nurse call systems and other systems of a healthcare facility. For example, the control system 160 may employ additional hardware and software similar to that disclosed in US2022/0233382 titled "TIME-BASED WIRELESS PAIRING BETWEEN A MEDICAL DEVICE AND A WALL UNIT," published Jul. 28, 2022 and USUS2022/0313515A1 titled "WIRELESS CONFIGURATION AND AUTHORIZATION OF A WALL UNIT THAT PAIRS WITH A MEDICAL DEVICE," published Oct. 6, 2022, each of which is incorporated by reference herein in their entirety.

With regard to the ability to add options to the patient support apparatus 210, the siderails 238, 240 shown in FIG. 13 are relatively complex. In addition to FIG. 13, refer to the control system block diagram of FIG. 15 for further reference to the control system components disclosed herein. For example, an occupant user interface 242 is positioned on the siderail 238 and includes inputs which would allow an occupant of the stretcher to adjust the configuration of the deck section to move from a flat position to raising a head deck section 244 or a thigh deck section 246. The siderail 238 also includes a USB outlets 248 which may be used by an occupant plug-in a USB cord to charge their phone or a similar personal digital assistant device. The siderail 238 also includes a pocket 250 which may be used by an occupant to store their smart phone. In other embodiments, the user interface 242, USB outlets 248, and/or the pocket 250 may be omitted depending on the use case for the particular patient support apparatus as discussed above. The siderail 240 includes an optional user interface 252 which is accessible by a caregiver to adjust the lift mechanism 218, or the head deck section 244, or thigh deck section 246. In addition, the embodiment of FIG. 13 includes a menu-driven GUI 254 which also is accessible by a caregiver. The GUI 254 is accessible by a caregiver to perform tasks such as, taking a patient weight from an integrated scale system, setting a patient position monitoring system, or connecting to peripheral equipment or a hospital wide network. The siderail 240 also includes an optional indicator bar 256 that illuminates to provide an indication of the status of the optional patient position monitoring system. For example, the indicator bar 256 may emit no color if the patient position monitoring system is not active, emit a green color if the patient position monitoring system is active and the patient is properly positioned, and emit an amber color if the patient position monitoring system is active in the patient is in an unexpected position or condition.

In addition, the patient support apparatus 210 of FIG. 13 further includes a notification system 151 positioned in a housing 152. The notification system 151 is operable to provide an indication of the status of discrete functions of the patient support apparatus 210 through a set of indicators 154. Similarly, the indication of the discrete functions may be illuminated on the floor by the notification system 151 as icons 156. The notification system 151 may function similarly to the notification systems disclosed in WO2016/196403A1 titled "PATIENT SUPPORT APPARATUS," published Dec. 8, 2012, or the notification systems disclosed in US2018/0184984A1 titled "PATIENT SUPPORT APPARATUS HAVING VITAL SIGNS MONITORING AND ALERTING," published Jul. 5, 2018, each of which are incorporated by reference herein for their disclosure of notification systems. The indicators 154 ore indicator bar 256 may be illuminated in different colors, such as blue, green, amber, or red, or may lack illumination depending on various conditions of various components of the patient support apparatus 210.

The patient support apparatus further includes a foot deck section 258 which is pivotably coupled to the knee deck section 246 as will be described in further detail below. The patient support apparatus 210 also includes a pair of multipurpose accessory arms 260, 262 which are movable between a lowered position shown in FIG. 13 and a raised position shown in FIG. 14. When in the raised position, the arms 260, 262 may be used by a patient to assist during their exiting of the patient support apparatus 210. The arms 260, 262 also may be used as foot supports for a patient supported on the patient support apparatus 210. When used as foot supports, the arms 260, 262 positioned the patient's legs like obstetrical stirrups to permit a caregiver improved access during gynecological or urological examinations or procedures.

The patient support apparatus 210 also includes a pair of push handles 264, 266 supported on the upper frame 232. The push handles 264, 266 our collapsible into stowed positions where they are supported on respective rests 268 and 270 so that they can be positioned out of the way of a caregiver who needs access to a patient from the head end 220 of the patient support apparatus 210. In the embodiment of FIG. 13, the push handles 264, 266 include respective activation switches 272, 274. The activation switches 272, 274 are used to enable the operation of an optional powered drive wheel 282 positioned in the center of the lower frame 212 as will be discussed in further detail below. The push handle 266 further includes a user interface 276 which when the power drive wheel 282 is enabled by activation of the activation switches 272, 274 allows a user to select the speed at which the drive wheel 282 will operate. The drive wheel 282 operates to move the patient support apparatus 210 over the floor with minimal effort by a caregiver to assist with transport, as is known in the art. The drive wheel 282 is part of a drive wheel assembly 284 which is similar to the drive wheel assembly disclosed in WO2016/196403A1 titled "PATIENT SUPPORT APPARATUS," published Dec. 8, 2012, which is incorporated by reference herein for the disclosure of the drive wheel assembly.

The patient support apparatus 210 also includes an oxygen tank holder 278 and an IV pole 280. Similar to the push handles 264, 266, the IV pole 280 is still available in a lowered position to allow it to be positioned out of the way when a caregiver needs access to a patient from the head end 220 of the patient support apparatus 210.

Figure 20:
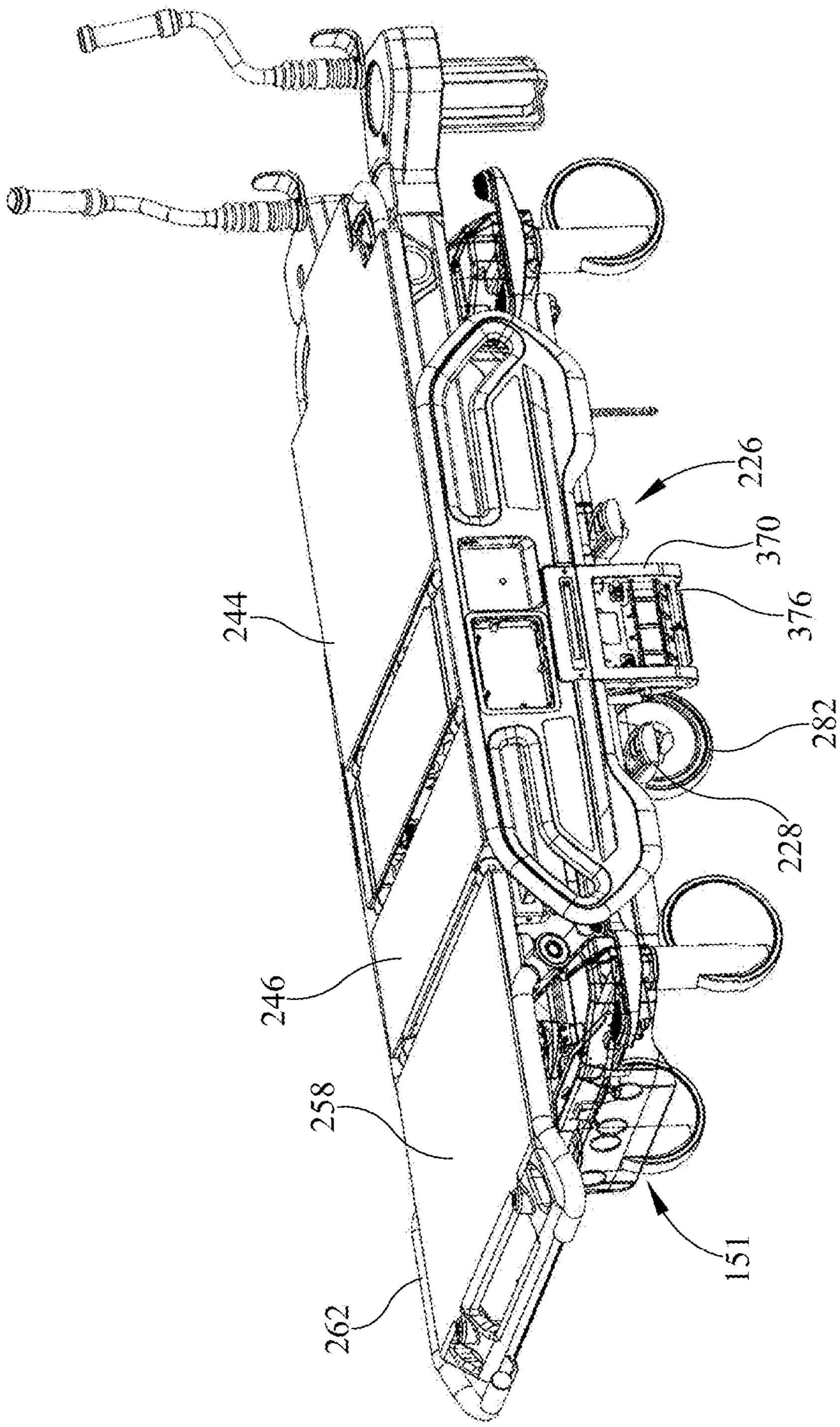
FIG. 20 is a perspective view of the embodiment of FIGS. 16-18 in a fully lowered position.

With this basic understanding of the structure of the patient support apparatus 210, it should be understood that the patient support apparatus 210 may be moved from the lowered position shown in FIG. 20 of a number of configurations shown in FIGS. 13 and 16-19.

Referring now to FIGS. 14 and 15, an embodiment of a patient support apparatus 210 is shown to include a user interface 290 positioned at a foot end 292 of the deck 234. The user interface 290 is operable to display and control the scale system outputs. In some embodiments, the user interface 290 is present when the siderails 238, 240 do not have the graphical user interface 254. For example, in embodiments where the rest of the patient support apparatus 210 is manual, meaning all of the operations are done without power assistance or electrical controls, a scale system 286 may be present to permit a patient to be weighed while on patient support apparatus 210. In such a case, the user interface 290 provides a capability for a caregiver to perform the function of weighing the patient without having to have the patient move from the bed to a separate scale system 286. The scale system 286 is configured similarly to the scale system disclosed in WO2016/196403A1 titled "PATIENT SUPPORT APPARATUS," published Dec. 8, 2012, which is incorporated by reference herein for the disclosure of the scale system.

FIG. 14 also shows the arms 260, 262 in a raised position. Each arm 260, 262 has a respective grip 294, 296 that is positioned in a generally horizontal arrangement when the respective arm 260, 262 is raised. The grips 294, 296 may be used by a caregiver to adjust the position of the patient support apparatus 210. However, the grips 294, 296 are properly positioned for a patient to use them to rest their calf or their foot during procedures that require such positioning, such as gynecological or urological exams.

Referring to FIG. 13, a cover 310 of the arms 306 includes indicia 312 which moves when the arm 306 moves to vary the orientation relative to a stationary indicia 314. The stationary indicia 314 is embodied as a pointer such that when the arms 306 moves, the height of the deck 234 is indicated by the portion of the indicia 312 corresponding to the pointer 314.

Figure 16:
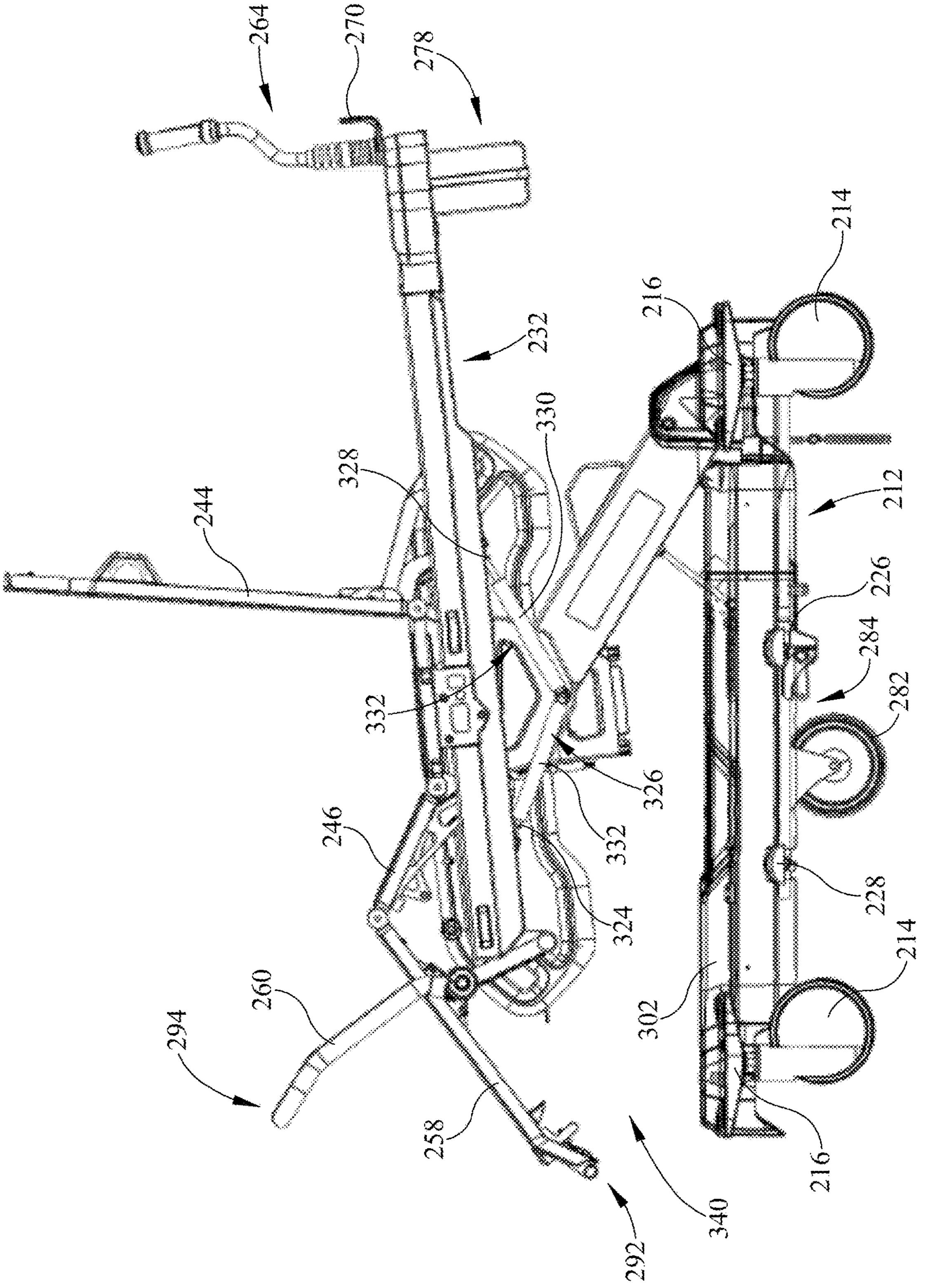
FIG. 16 is a side view of another embodiment of a patient support apparatus.
Figure 17:
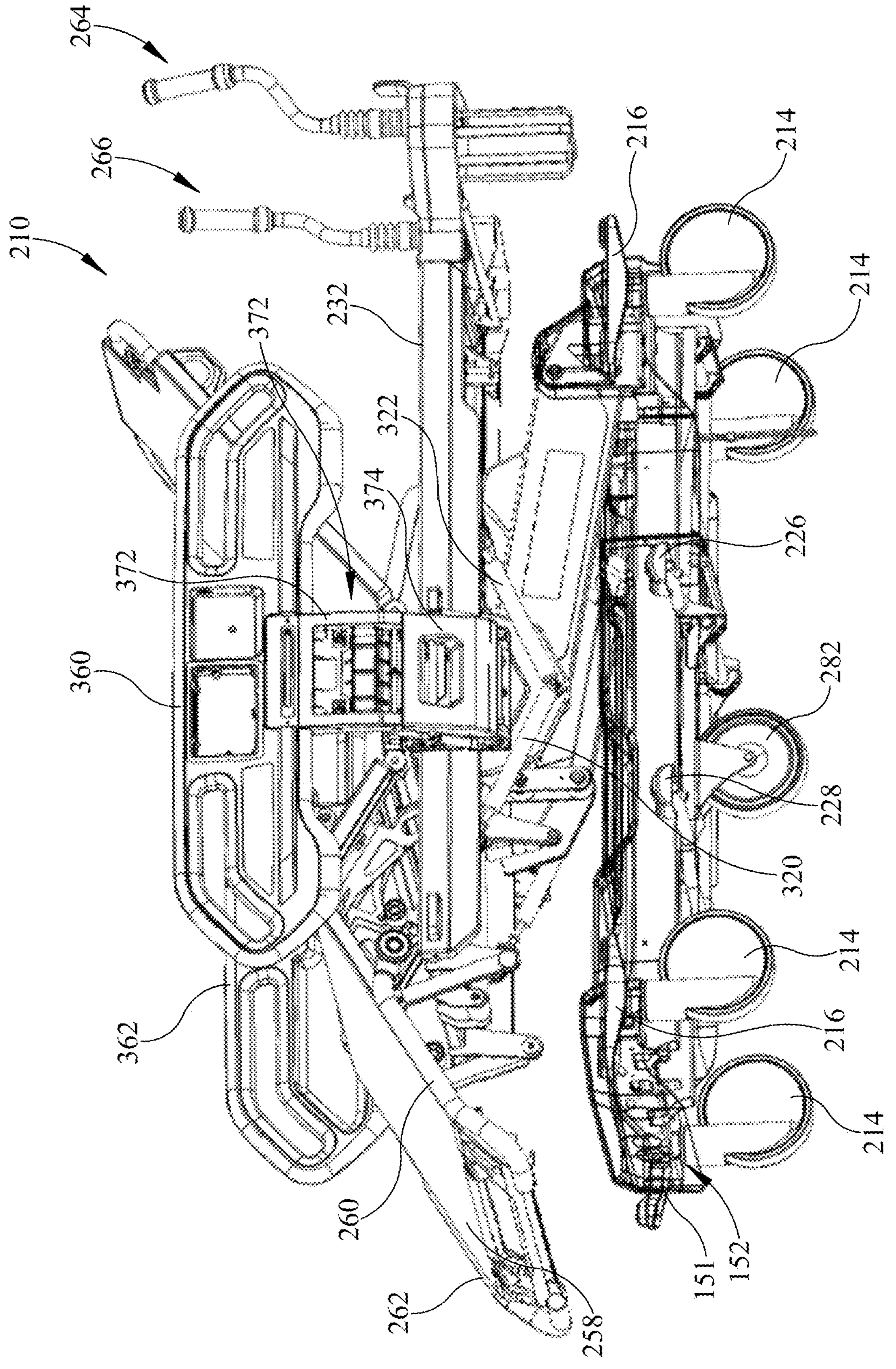
FIG. 17 is a perspective view of the embodiment of FIG. 16.
Figure 18:
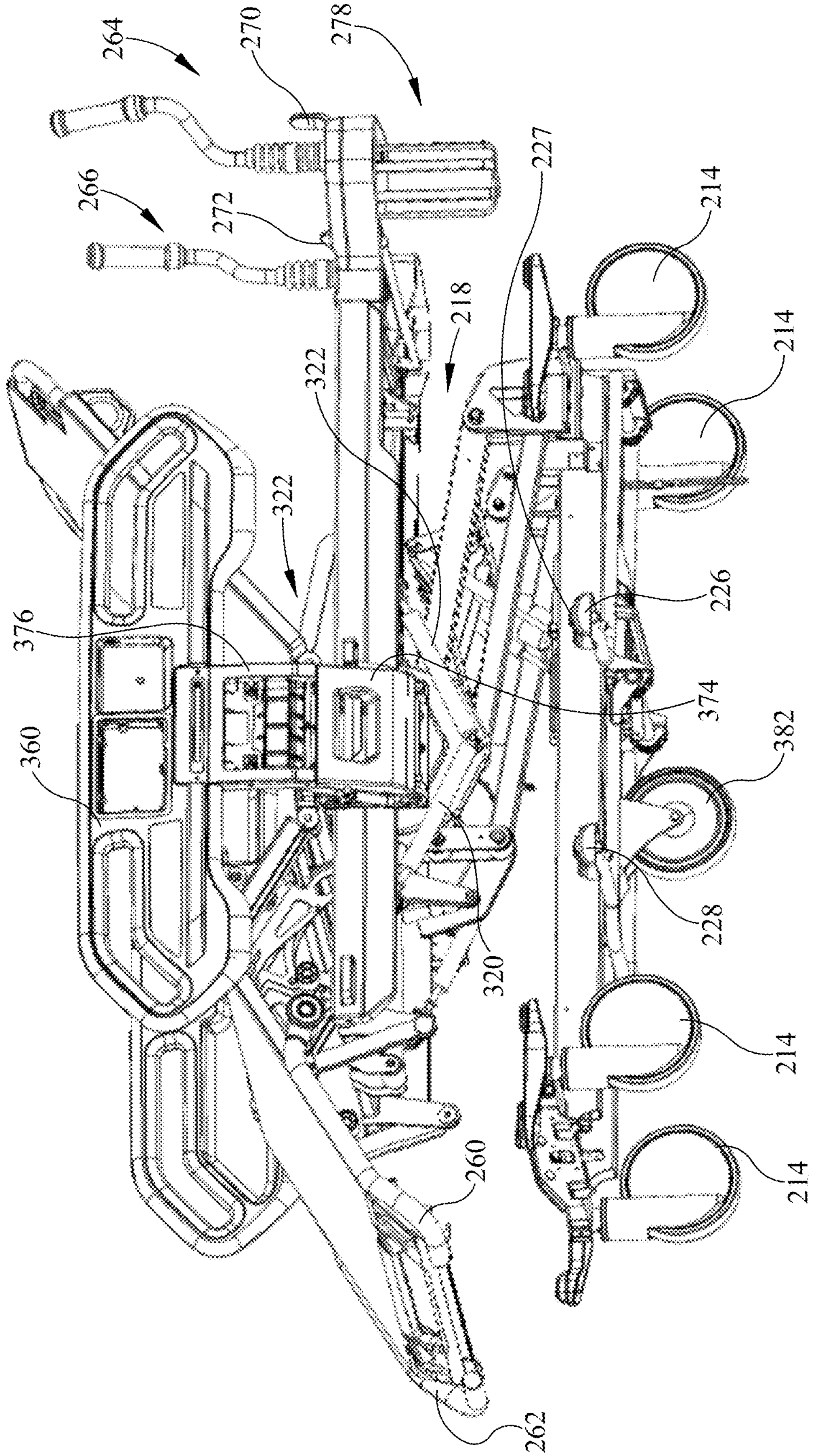
FIG. 18 is a perspective view of the embodiment of FIGS. 16-17 with portions removed.

Referring now to FIG. 16, the patient support apparatus is viewed from the side with a siderail removed to show the upper frame 232 in a tilted position with the foot end 292 lower than the head end 220. With the head deck section 244 and the knee deck section 246 fully raised and the foot section 258 fully lowered, the patient support apparatus 210 is positioned in a chair position. The patient support apparatus 210 includes a foot end tilt control cylinder 320 and a head end tilt control cylinder 322. While not seen in FIG. 16, there are matching pair of cylinders 320, 322 on the opposite side of the lift mechanism 218. The tilt control cylinders 320, 322 maintain and control the tilt angle of the upper frame 232 relative to the lift mechanism 218. The tilt control cylinders 320, 322 have a manual release positioned at the head end 220 of the upper frame 232 that, when released, allows for free movement of a rod 324 relative to a cylinder base 326 of the cylinder 320. The manual release also releases a rod 328 relative to the cylinder base 330 of the cylinder 322. Once the rod 324, 328 released, a user may raise or lower the head end 220 of the upper frame 232 manually. In the prior art, cylinders 320, 322 were single acting compression springs that provided some resistance of rotation of the upper frame 232 relative to the lift mechanism 218. In the present embodiments, the cylinders 320, 322 are double acting cylinders that are balanced with their respective charges to provide a smooth control and assistance to a user when they are moving the upper frame 232 into a tilt or reverse tilt position. In other words, the cylinders 320, 322 are configured to cooperate to control the movement of the upper frame 232 to prevent a user from having to apply significant force to move the upper frame into a tilt position, such as that shown in FIG. 16. The gas charge on each side of the piston in each respective cylinder 320, 322 is chosen to cause the upper frame 232 to be balanced relative to the lift mechanism 218 under normal loading conditions. As the rod 324 is urged into the cylinder base 326 of the cylinder 320, the movement is resisted by the gas load on the cylinder base side of a piston within the cylinder 320. However, extension of the rod 328 relative to the cylinder base 330 of the cylinder 322 is assisted by the gas load within the cylinder 322 on the cylinder base side of a piston within the cylinder 322. In addition, the gas on the rod side of each of the cylinders 320, 322 is also acting on the piston to control movement of the piston of the respective cylinders 320, 322 to counterbalance the relative force being applied on the cylinder base side of the pistons. The effect of this design is to provide a smoothly balanced movement of the upper frame through range of motions. In some embodiments, the tilt control cylinders 230, 232 may be configured to have a variable spring rate as described above with regard to the gas spring 64' of FIG. 19.

Referring now again to FIG. 16, it can be seen that the foot end of the upper frame 232 does not extend the full length of the shroud 302 covering the lower frame 212. This provides an open space generally indicated by 340 in FIG. 16. The area or space 340 allows for significant clearance for the foot deck section 258 to lower into the dependent position shown in FIG. 16. This allows the patient's feet to be dropped below the upper frame 232 as shown in FIGS. 16-19. This is a significant improvement over prior art systems where the foot end 292 of the foot deck section 258 could be lowered no lower than the intermediate frame 230 because this position is more comfortable for patients during procedures and consults. In addition, this allows the patient support apparatus 210 to achieve an improved position for the gynecological and urological exams discussed above. So, in combination with the lift mechanism to 18 which is not positioned under the legs of the patient at all, superior clearance is provided under the foot end of the patient when the lift mechanism 218 is in the raised position.

Figure 21:
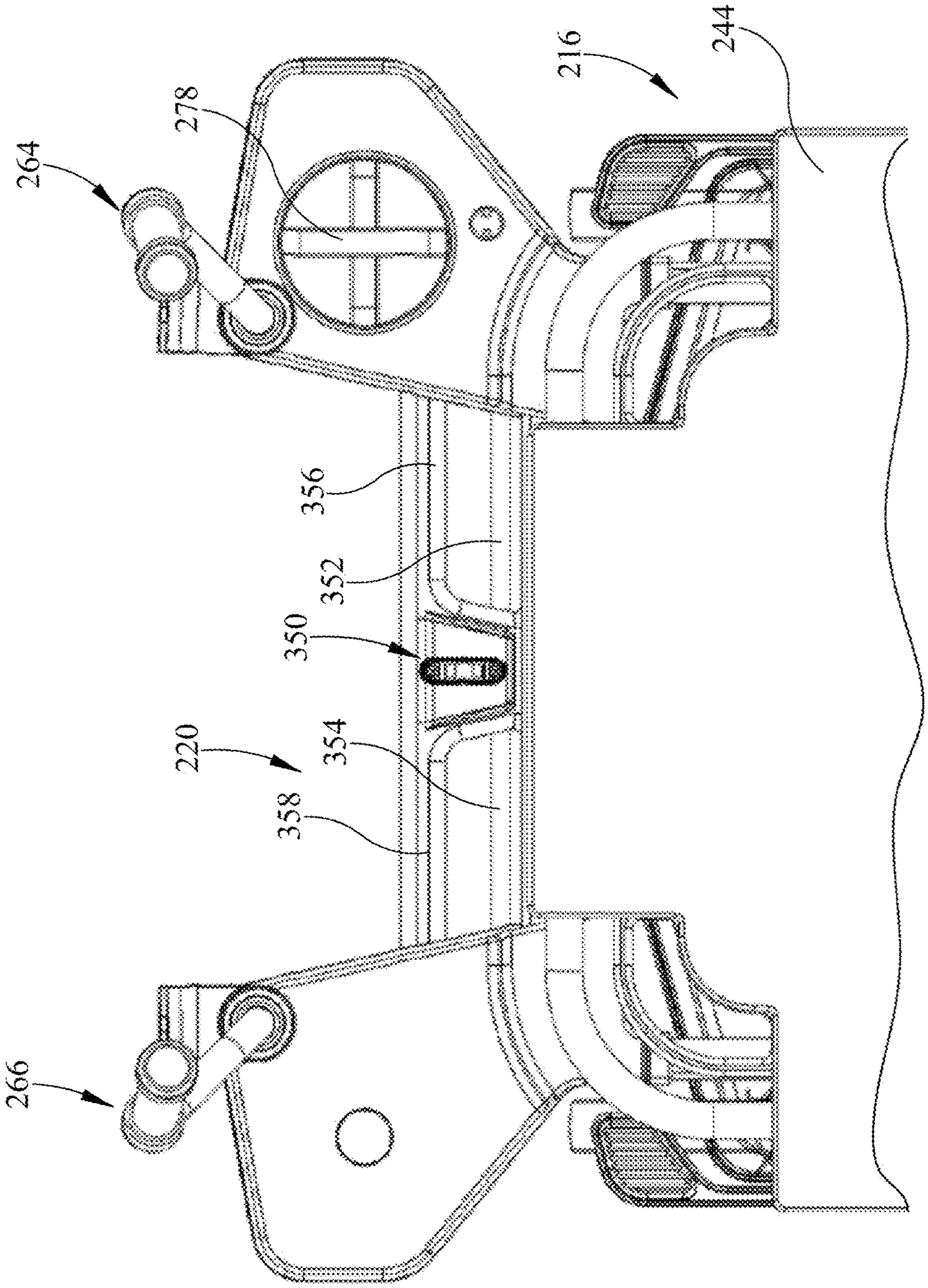
FIG. 21 is a perspective view of the head end of a patient support apparatus showing the user interface for controlling a tilting of an upper frame of the patient support apparatus.

Referring now to FIG. 21, a tilt control panel 348 is shown to include a pair of squeeze scripts 352, 354 positioned adjacent a pair of fixed scripts 356, 358. The user will position their palms on the fixed grips 356, 358 and wrapped her fingers around the respective squeeze grips 352, 354 to actuate the mechanism to release the tilt control cylinders 320, 322. A site bubble 350 provides an indication of the degree of tilt that is experienced by the upper frame 232. This allows a user to quickly place the patient in an appropriate amount of tilt for the particular situation. The squeeze grips 352, 354 are connected to a linkage that acts on the release mechanism of the cylinders 320, 322 to release them for movement. Once of the appropriate tilt is achieved, the squeeze grips 352, 354 are released to cause the cylinders 320, 322 to be secured in the appropriate position.

Figure 22:
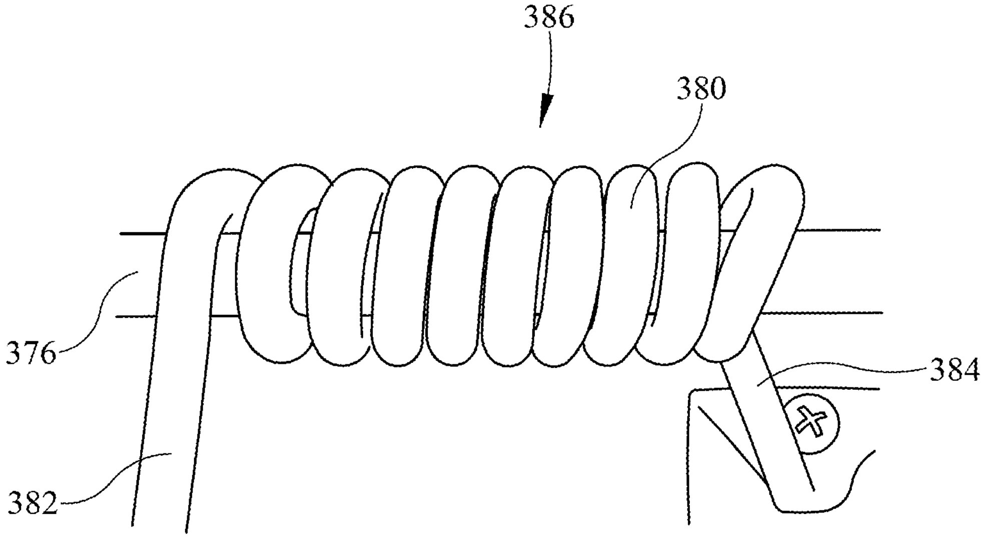
FIG. 22 is a perspective view of a cable coil for a siderail of the present disclosure.
Figure 23:
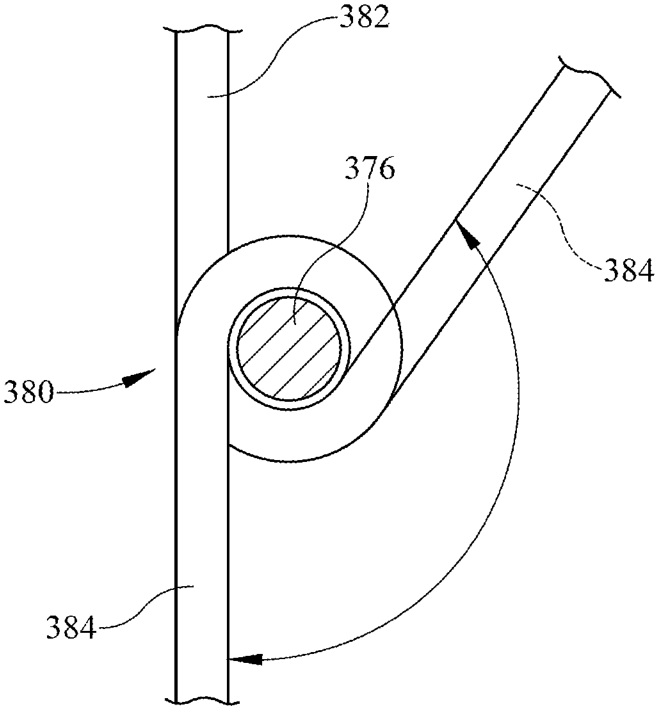
FIG. 23 is a diagrammatic representation of the cable coil of FIG. 22.

Referring now to FIGS. 22-23, an illustration of an approach for managing cables that are routed from the upper frame 232 to respective siderail bodies 360, 362 of the siderails 240, 238 is illustrated. Comparing FIG. 18 to FIG. 20, it can be seen that an upper arm 370 of a siderail mechanism 372 pivots relative to a lower arm 374 when the siderail 240 is moved between the raised position shown in FIG. 18 and a lowered position shown in FIG. 20. A pivot pin 376 is used control that pivoting between the upper arm 370 in the lower arm 374. In the prior art, cables have been routed straight down through the siderail mechanism 372 and subjected to the twisting that occurs when the siderail is lowered. As shown in FIG. 22, a cable 380 is wrapped around a pin 376 a first end 382 moves when the upper arm 370 moves relative to the lower arm 374. The end 382 is directed into the siderail body 360. The opposite end 384 is in the lower arm 374 and moves about the pin 376 when the siderail 240 is lowered. As shown in FIG. 23, the end 384 moves through an angle of 143.5° during this movement. Use of a set of coils 386 of the cable 380 over multiple wraps, allows the flexion that is induced in the cable 380 to be transferred over the coils 386 to reduce the fatigue applied to the cable 380 during the rotations that occur over the life of the siderail 240. This is been found to greatly increase the life of the cable 380 before fatigue damage occurs to the conductors within the cable 380.

Figure 24:
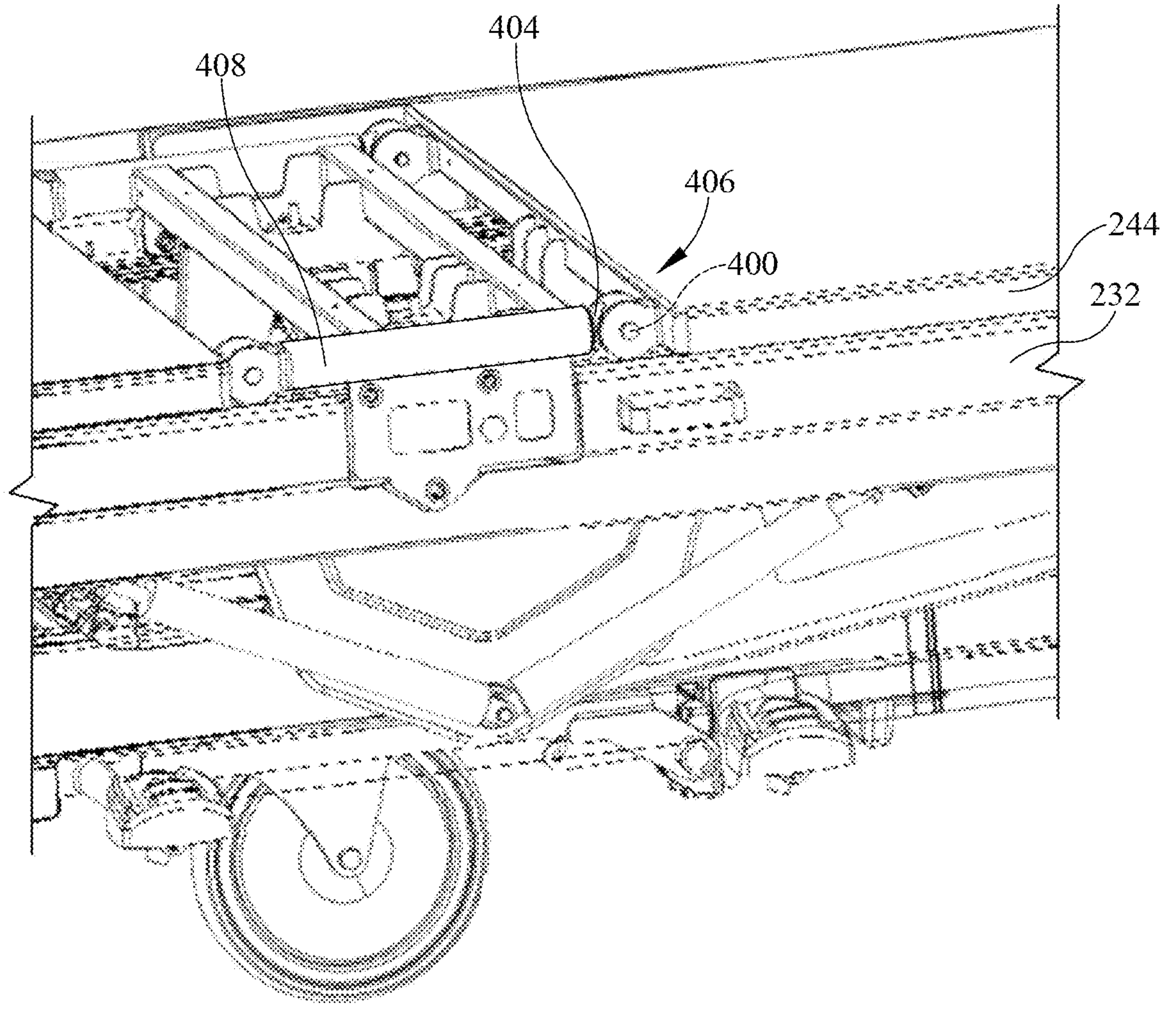
FIG. 24 is a view of a portion of the patient support apparatus of FIGS. 16-28, FIG. 24 having a head deck section in a lowered position.
Figure 25:
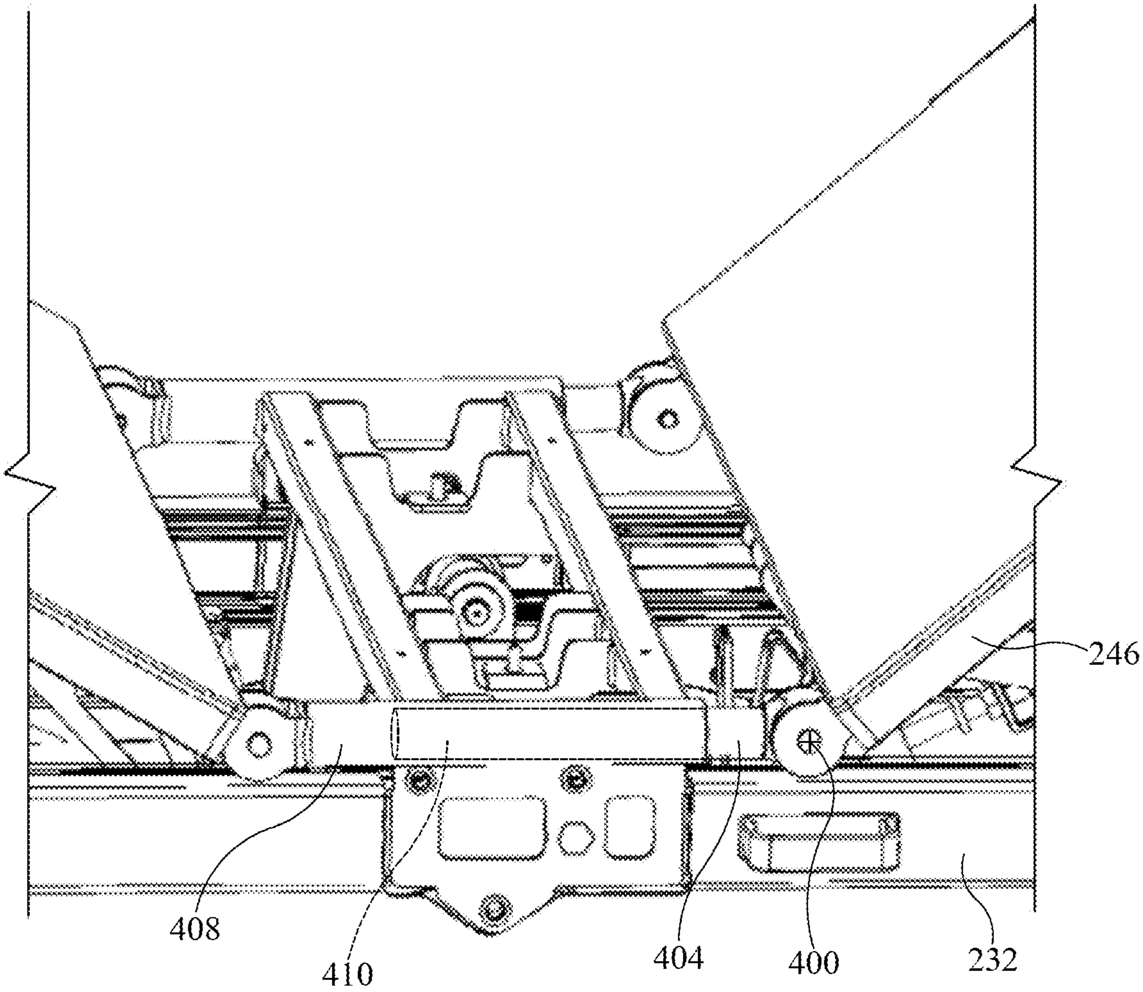
FIG. 25 is a view similar to FIG. 24 with the head deck section in a raised position.
Figure 26:
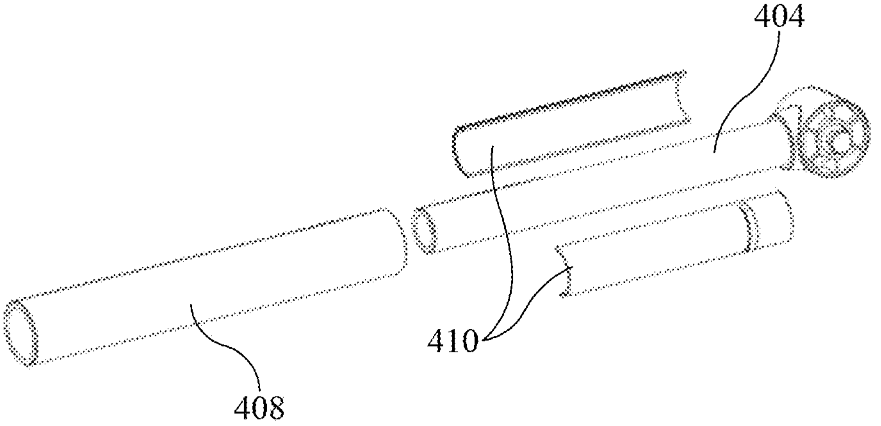
FIG. 26 is an enlarged view of a portion of the view of FIG. 25.

FIGS. 24-26 illustrate the approach that is used to cause a pivot.400 of the head deck section 244 to move linearly as the head deck section 244 moves between a lowered position as shown in FIG. 24 and the raised position shown in FIG. 25. This linear movement is used provide relief for the mattress during the movement of the head deck section 244 to reduce the amount of sheer experienced by a patient scan supported on the patient support apparatus 210. The linear movement is indicated by an arrow 400 to in FIG. 25. The structure that achieves this linear movement includes a rod 404 which is pivotally coupled to the pivot yoke 406 of the head deck section 244. The rod moves relative to a sleeve 408 which is secured to the upper frame 232. A split bearing 410 is captured within the sleeve 408, the bushing configured to receive the rod 404 and supported relative to the sleeve 408 for movement of the rod 404 relative to the sleeve 408. The interface between the bearing 410 and the rod 404 has limited friction as the bearing 410 is a low friction material, such as a low friction plastic material. As the head deck section 244 is raised, either manually or electrically, a pair of control arms 412, 414 control the movement of the head deck section 244 relative to the upper frame 232 by acting as constraints and the motion of the head deck section 244 is transferred to the pinned joint at 400 which causes the rod 404 to move in the bearing 410 relative to the sleeve 408. While not described in detail, it should be understood that a separate assembly 416 is arranged in a similar manner on the opposite side of the head deck section 244 so that there is a common pivot axis 402 and the movement of the head deck section 244 is controlled on both sides.

Although this disclosure refers to specific embodiments, it will be understood by those skilled in the art that various changes in form and detail may be made without departing from the subject matter set forth in the accompanying claims. For example, the disclosure has been illustrated and described in detail in the drawings and the foregoing description, such illustration and description are to be considered illustrative or exemplary and not restrictive. The disclosure is not limited to the disclosed embodiments. From reading the present disclosure, other modifications will be apparent to a person skilled in the art. Such modifications may involve other features, which are already known in the art and may be used instead of or in addition to features already described herein. In the claims, the word "comprising" does not exclude other elements or steps, and the indefinite article "a" or "an" does not exclude a plurality.

The invention claimed is:

1. A patient support apparatus comprising:

a support frame, a patient support deck including a thigh deck section pivotably coupled to the support frame at a first pivot of the thigh deck section and movable relative to the support frame, a calf deck section pivotably coupled to the thigh deck section at a second pivot of the thigh deck section, the calf deck section having a distal end away from the thigh deck section, a motion control linkage engaged with the calf deck section and the support frame to control movement of the calf deck section relative to the support frame, a variable length bias member supported on the support frame and applying a bias force to the thigh deck section, the variable length bias member movable between a first position in which the variable length bias member applies a force to the thigh deck section that secures the thigh deck section and the calf deck section in a flat configuration and a second position in which the variable length bias member causes the thigh deck section and the calf deck section to move such that the second pivot of the thigh deck section is moved vertically upwardly and the distal end of the calf deck section is positioned vertically lower than the first pivot of the thigh deck section, and an adjustable-length strut positioned between the support frame and the thigh deck section, wherein the adjustable-length strut comprises an electric actuator.

2. The patient support apparatus of claim 1, wherein the variable length bias member is configured to apply the bias force directly to a side of the first pivot of the thigh deck section opposite the second pivot of the thigh deck section when the thigh deck section and the calf deck section are in the flat configuration.

3. The patient support apparatus of claim 2, wherein the bias force is configured to produce a moment about the first pivot of the thigh deck section and urge the second pivot of the thigh deck section toward the support frame.

4. The patient support apparatus of claim 2, wherein the bias member is configured to apply the bias force directly between the first pivot and the second pivot of the thigh deck section when the variable length bias member is in the second position.

5. The patient support apparatus of claim 4, wherein the bias force is configured to produce a moment about the first pivot of the thigh deck section and urge the second pivot of the thigh deck section away from the support frame.

6. The patient support apparatus of claim 5, wherein the adjustable-length strut is configured to overcome the moment created by the bias member as the thigh deck section is moved from the flat configuration to a fully articulated configuration.

7. The patient support apparatus of claim 4, wherein the adjustable-length strut is movable between a first position and a second position, and lockable at a plurality of positions therebetween.

8. The patient support apparatus of claim 7, wherein the adjustable-length strut is movable between the first position and the second position by using a release mechanism located at the calf deck section.

9. The patient support apparatus of claim 8, wherein the adjustable-length strut is configured to overcome the moment created by the bias member as the thigh deck section is moved from the flat configuration to a fully articulated configuration.

10. The patient support apparatus of claim 4, wherein the bias member is a gas spring.

11. The patient support apparatus of claim 10, wherein the gas spring has a first spring rate through a first distance of compression and a second spring rate through a second distance of compression.

12. The patient support apparatus of claim 10, wherein the gas spring comprises a mechanical spring engaged during the second distance of compression.

13. The patient support apparatus of claim 2, wherein the adjustable-length strut is configured to overcome the moment created by the bias member as the thigh deck section is moved from the flat configuration to a fully articulated configuration.

14. The patient support apparatus of claim 1, wherein the adjustable-length strut is configured to overcome the moment created by the bias member as the thigh deck section is moved from the flat configuration to a fully articulated configuration.

15. The patient support apparatus of claim 1, wherein the adjustable-length strut is movable between a first position and a second position, and lockable at a plurality of positions therebetween.

16. The patient support apparatus of claim 10, wherein the adjustable-length strut is movable between the first position and the second position by using a release mechanism located at the calf deck section.

17. The patient support apparatus of claim 1, wherein the bias force is configured to produce a moment about the first pivot of the thigh deck section and urge the second pivot of the thigh deck section toward the support frame.

18. The patient support apparatus of claim 17, wherein the bias member is a gas spring.

19. The patient support apparatus of claim 18, wherein the gas spring has a first spring rate through a first distance of compression and a second spring rate through a second distance of compression.

20. The patient support apparatus of claim 17, wherein the adjustable-length strut is configured to overcome the moment created by the bias member as the thigh deck section is moved from the flat configuration to a fully articulated configuration.

* * * * *